United States Patent
Zhang et al.

(10) Patent No.: US 11,729,032 B2
(45) Date of Patent: Aug. 15, 2023

(54) DATA TRANSMISSION METHOD AND APPARATUS

(71) Applicant: Huawei Technologies Co., Ltd., Shenzhen (CN)

(72) Inventors: Jiayin Zhang, Shanghai (CN); Jun Zhu, Shenzhen (CN); Yalin Liu, Shanghai (CN); Yingpei Lin, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/519,405

(22) Filed: Nov. 4, 2021

(65) Prior Publication Data

US 2022/0173852 A1 Jun. 2, 2022

Related U.S. Application Data

(63) Continuation of application No. 16/819,516, filed on Mar. 16, 2020, now Pat. No. 11,212,148, which is a
(Continued)

(30) Foreign Application Priority Data

Sep. 30, 2014 (WO) ................ PCT/CN2014/088063
Oct. 15, 2014 (WO) ................ PCT/CN2014/088661

(51) Int. Cl.
*H04L 29/06* (2006.01)
*H04L 27/26* (2006.01)
(Continued)

(52) U.S. Cl.
CPC ........ *H04L 27/2602* (2013.01); *H04L 5/0044* (2013.01); *H04L 5/0053* (2013.01);
(Continued)

(58) Field of Classification Search
CPC ... H04L 27/2602; H04L 27/2603; H04L 9/40; H04L 5/0044; H04L 45/08; H04L 5/0053
See application file for complete search history.

(56) References Cited

U.S. PATENT DOCUMENTS

2006/0067444 A1* 3/2006 Hamamoto ........... H04L 1/0054
375/347
2009/0257515 A1 10/2009 Chang et al.
(Continued)

FOREIGN PATENT DOCUMENTS

| CN | 101355408 A | 1/2009 |
|---|---|---|
| CN | 101959240 A | 1/2011 |

(Continued)

OTHER PUBLICATIONS

"Part 11: Wireless LAN Medium Access Control (MAC) And Physical Layer (PHY) Specifications, Amendment 4: Enhancements for Very High Throughput for Operation in Bands Below 6 GHz," IEEE Standard for Information Technology—Telecommunications and Information Exchange between Systems—Local and Metropolitan Area Networks Specific Requirements, IEEE Computer Society, IEEE Std 802.11, 2013, 425 pages.
(Continued)

*Primary Examiner* — Anez C Ebrahim
(74) *Attorney, Agent, or Firm* — Slater Matsil, LLP

(57) ABSTRACT

A method includes generating a preamble for a protocol version of a wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the first OFDM symbol is the same as that of the second OFDM symbol, and sending the preamble to a receive end device, so that the receive end device restores the preamble, and
(Continued)

when determining that input information bits obtained after restoring the first OFDM symbol and the second OFDM symbol are the same, determines that the preamble is the preamble of the protocol version.

8 Claims, 12 Drawing Sheets

Related U.S. Application Data continuation of application No. 16/264,926, filed on Feb. 1, 2019, now Pat. No. 10,637,702, which is a continuation of application No. 15/473,269, filed on Mar. 29, 2017, now Pat. No. 10,200,225, which is a continuation of application No. PCT/CN2015/080710, filed on Jun. 3, 2015.

(51) Int. Cl.
    *H04L 5/00*     (2006.01)
    *H04L 9/40*     (2022.01)
    *H04L 45/02*     (2022.01)
    *H04W 84/12*     (2009.01)

(52) U.S. Cl.
    CPC ............ *H04L 9/40* (2022.05); *H04L 27/2603* (2021.01); *H04L 45/08* (2013.01); *H04W 84/12* (2013.01)

(56) References Cited

U.S. PATENT DOCUMENTS

| | | | |
|---|---|---|---|
| 2009/0310699 A1 | 12/2009 | Kodama et al. | |
| 2009/0318088 A1 | 12/2009 | Wu et al. | |
| 2011/0194475 A1 | 8/2011 | Kim et al. | |
| 2013/0121245 A1 | 5/2013 | Vermani et al. | |
| 2013/0136097 A1 | 5/2013 | Yu et al. | |
| 2013/0159458 A1 | 6/2013 | Yu et al. | |
| 2013/0259017 A1 | 10/2013 | Zhang et al. | |
| 2013/0336257 A1 | 12/2013 | Lee et al. | |
| 2014/0029681 A1 | 1/2014 | Zhang et al. | |
| 2014/0211775 A1 | 7/2014 | Sampath et al. | |
| 2014/0307650 A1 | 10/2014 | Vermani et al. | |
| 2015/0117227 A1* | 4/2015 | Zhang ................ H04L 27/2698 370/245 |
| 2015/0139365 A1 | 5/2015 | Zhang et al. | |
| 2016/0056991 A1 | 2/2016 | Zhang et al. | |

FOREIGN PATENT DOCUMENTS

| | | |
|---|---|---|
| CN | 102932091 A | 2/2013 |
| CN | 102984112 A | 3/2013 |
| CN | 103563279 A | 2/2014 |
| CN | 103947171 A | 7/2014 |
| JP | 2014506088 A | 3/2014 |
| RU | 2536372 C2 | 12/2014 |
| WO | 2010047451 A1 | 4/2010 |
| WO | 2010055980 A1 | 5/2010 |
| WO | 2011000109 A1 | 1/2011 |
| WO | 2011006419 A1 | 1/2011 |

OTHER PUBLICATIONS

"Part 11: Wireless LAN Medium Access Control (MAC) and Physical Layer (PHY) Specifications Amendment 5: Enhancements for Higher Throughput," IEEE Standard for Information Technology—Telecommunications and Information Exchange between Systems—Local and Metropolitan Area Networks Specific Requirements, IEEE Std 802.11n, 2009, 536 pages.

"Part 11: Wireless LAN Medium Access Control (MAC) and Physical Layer (PHY) Specifications," IEEE Standard for Information Technology Telecommunications and Information Exchange Between Systems Local and Metropolitan Area Networks Specific Requirements, IEEE Std. 802.11, 2012, 2695 pages.

\* cited by examiner

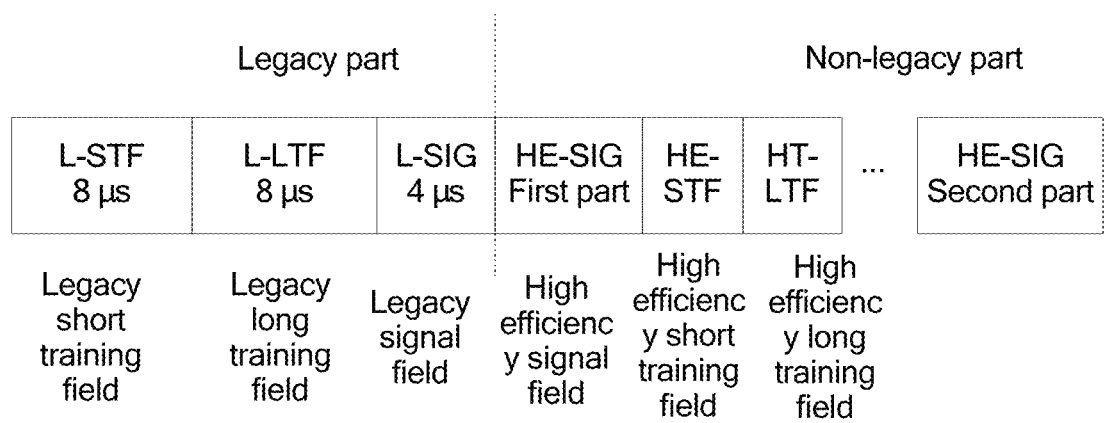

FIG. 1

```
Generate a preamble for a protocol version of a wireless
local area network, where the preamble includes a legacy
signal L-SIG field and a high efficiency signal HE-SIG field
that are arranged in order, the HE-SIG field includes a first
orthogonal frequency division multiplexing OFDM symbol
and a second OFDM symbol that are arranged in order, and
an input information bit of the first OFDM symbol is the
same as that of the second OFDM symbol
```
⟶ 201

Send the preamble to the receive end device ⟶ 202

FIG. 2

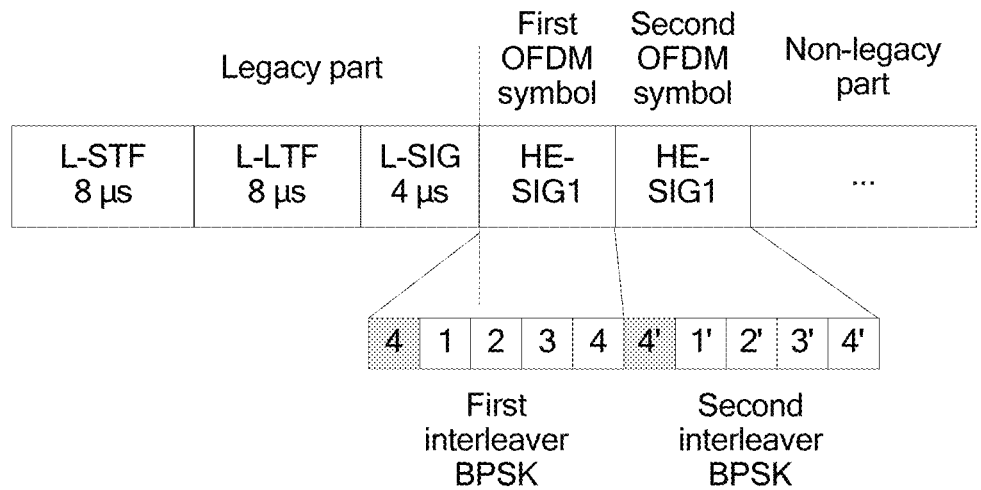
FIG. 4
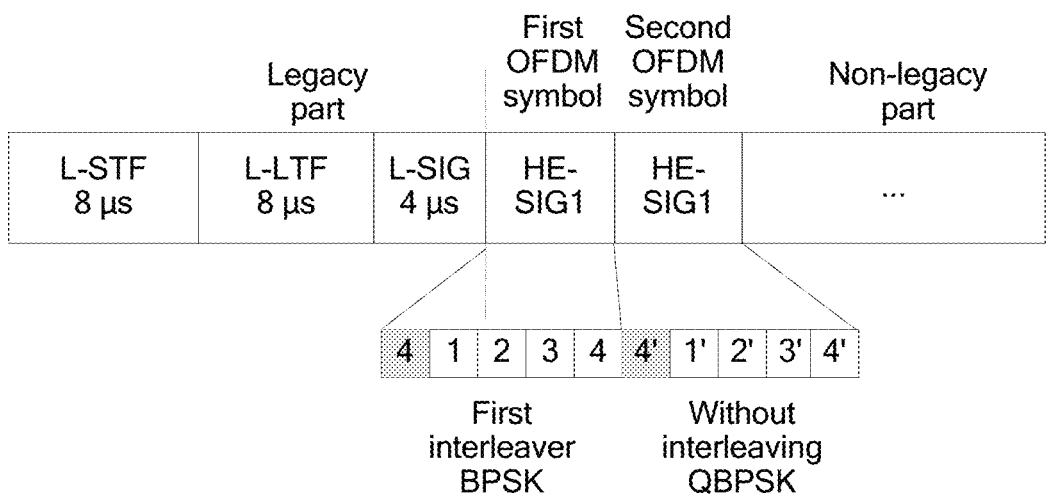
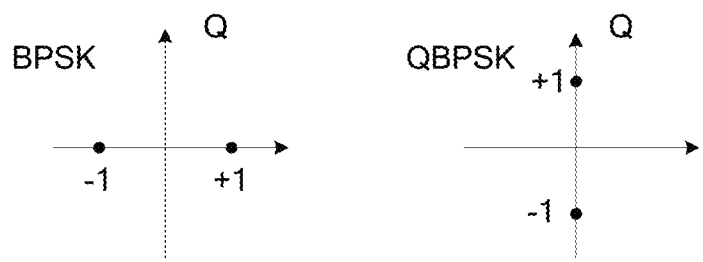
FIG. 5

DATA TRANSMISSION METHOD AND APPARATUS

CROSS-REFERENCE TO RELATED APPLICATIONS

This application is a continuation of U.S. patent application Ser. No. 16/819,516, filed on Mar. 16, 2020, which is a continuation of U.S. patent application Ser. No. 16/264,926, filed on Feb. 1, 2019, now U.S. Pat. No. 10,637,702, which is a continuation of U.S. patent application Ser. No. 15/473,269, filed on Mar. 29, 2017, now U.S. Pat. No. 10,200,225, which is a continuation of International Application No. PCT/CN2015/080710, filed on Jun. 3, 2015. The International Application claims priority to International Patent Application No. PCT/CN2014/088063, filed on Sep. 30, 2014 and International Patent Application No. PCT/CN2014/088661, filed on Oct. 15, 2014. All of the aforementioned patent applications are hereby incorporated by reference in their entireties.

TECHNICAL FIELD

Embodiments of the present invention relate to the field of communications technologies, and more specifically, to a data transmission method and an apparatus.

BACKGROUND

Standardization of a wireless local area network (WLAN) by using an 802.11 standard family significantly reduces costs of a WLAN technology. Wireless Fidelity (Wi-Fi) is a brand of a wireless network communications technology and held by the Wi-Fi Alliance, and an objective of Wi-Fi is to improve interoperability between wireless network products based on the 802.11 standards. A wireless local area network using a series of 802.11 protocols may be referred to as a Wi-Fi network.

Currently, an 802.11 standard version has been evolved from 802.11a/b to 802.11g, 802.11n, 802.11ac, and latest 802.11ax. To ensure backward compatibility and interoperability between products of different 802.11 standard versions, a mixed format (MF) preamble has been defined since 802.11n. A legacy field part of the preamble is the same as a preamble field of 802.11a, both including a legacy short training field, a legacy long training field, and a legacy signal field. A preamble for a version later than 802.11n further includes, in addition to a legacy field part, a non-legacy field part that specifically includes a non-legacy signal field, a non-legacy short training field, a non-legacy long training field, and the like. The non-legacy field part of 802.11n is named as high throughput (HT), that is, the non-legacy field part includes: a high throughput signal field, a high throughput short training field, and a high throughput long training field. A non-legacy field part of 802.11ac is named as very high throughput (VHT), that is, the non-legacy field part includes: a very high throughput signal (VHG-SIG) field A, a very high throughput short training field, and a very high throughput long training field, and a very high throughput signal field B. In the current 802.11 standard versions, distinction between protocol versions and auto-detection at a receive end may be implemented according to a modulation manner of a symbol following a preamble legacy field.

For an 802.11ax version, how to use a preamble to distinguish between protocol versions and implement rapid and reliable auto-detection of a protocol version becomes a problem to be urgently resolved.

SUMMARY

Embodiments of the present invention provide a data transmission method and an apparatus, so as to implement rapid and reliable auto-detection of a preamble of an 802.11ax version.

According to a first aspect, a data transmission method is provided, including: generating a preamble for a protocol version of a wireless local area network, where the preamble includes one or a combination of a legacy signal (L-SIG) field and a high efficiency signal (HE-SIG) field, the L-SIG field or the HE-SIG field includes a first orthogonal frequency division multiplexing (OFDM) symbol and a second OFDM symbol that are arranged in order, and an input information bit of the first OFDM symbol is the same as that of the second OFDM symbol, and sending the preamble to a receive end device.

According to a second aspect, a data transmission method is provided, including receiving a preamble sent by a transmit end device for a protocol version of a wireless local area network, where the preamble includes one or a combination of a legacy signal (L-SIG) field and a high efficiency signal (HE-SIG) field, the L-SIG field or the HE-SIG field includes a first orthogonal frequency division multiplexing (OFDM) symbol and a second OFDM symbol that are arranged in order, and an input information bit of the second OFDM symbol is the same as that of the first OFDM symbol, restoring the first OFDM symbol and the second OFDM symbol that are in the HE-SIG field of the preamble, determining that sequences obtained after the first OFDM symbol and the second OFDM symbol are restored are the same, that is, determining that the preamble is a preamble of the first protocol version, and processing a remaining field of the preamble and a data part according to a predetermined rule of the protocol version.

According to a third aspect, a transmit end device is provided, including: a generation unit, configured to generate a preamble for a protocol version of a wireless local area network, where the preamble includes one or a combination of a legacy signal (L-SIG) field and a high efficiency signal (HE-SIG) field, the L-SIG field or the HE-SIG field includes a first orthogonal frequency division multiplexing (OFDM) symbol and a second OFDM symbol that are arranged in order, and an input information bit of the first OFDM symbol is the same as that of the second OFDM symbol, and a sending unit, configured to send the preamble to a receive end device.

According to a fourth aspect, a receive end device is provided, including: a receiving unit, configured to receive a preamble sent by a transmit end device for a protocol version of a wireless local area network, where the preamble includes one or a combination of a legacy signal (L-SIG) field and a high efficiency signal (HE-SIG) field, the L-SIG field or the HE-SIG field includes a first orthogonal frequency division multiplexing (OFDM) symbol and a second OFDM symbol that are arranged in order, and an input information bit of the second OFDM symbol is the same as that of the first OFDM symbol, a restoration unit, configured to restore the first OFDM symbol and the second OFDM symbol that are in the HE-SIG field of the preamble, and a determining unit, configured to determine that sequences obtained after the first OFDM symbol and the second OFDM symbol are restored are the same, that is, determining that the preamble is a preamble of the first protocol version, where the restoration unit is further configured to process a remaining field of the preamble and a data part according to a predetermined rule of the protocol version.

According to the embodiments of the present invention, a preamble for a protocol version of a wireless local area network is generated, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the first OFDM symbol is the same as that of the second OFDM symbol, and the preamble is sent to a receive end device, so that the receive end device restores the preamble, and when determining that input information bits obtained after restoring the first OFDM symbol and the second OFDM symbol are the same, determines that the preamble is the preamble of the protocol version. Rapid and reliable auto-detection of a preamble of an 802.11ax protocol version can be implemented. In addition, when 802.11ax is applied to an outdoor scenario, reliability and correctness of preamble transmission and auto-detection can be improved by using the first OFDM symbol and the second OFDM symbol that have the same input information bit.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic structural diagram of a preamble according to an embodiment of the present invention;

FIG. 2 is a schematic flowchart of a data transmission method according to an embodiment of the present invention;

FIG. 4 is a schematic structural diagram of a preamble according to an embodiment of the present invention;

FIG. 5 is a schematic structural diagram of a preamble according to another embodiment of the present invention;

DETAILED DESCRIPTION OF ILLUSTRATIVE EMBODIMENTS

Figure 3:
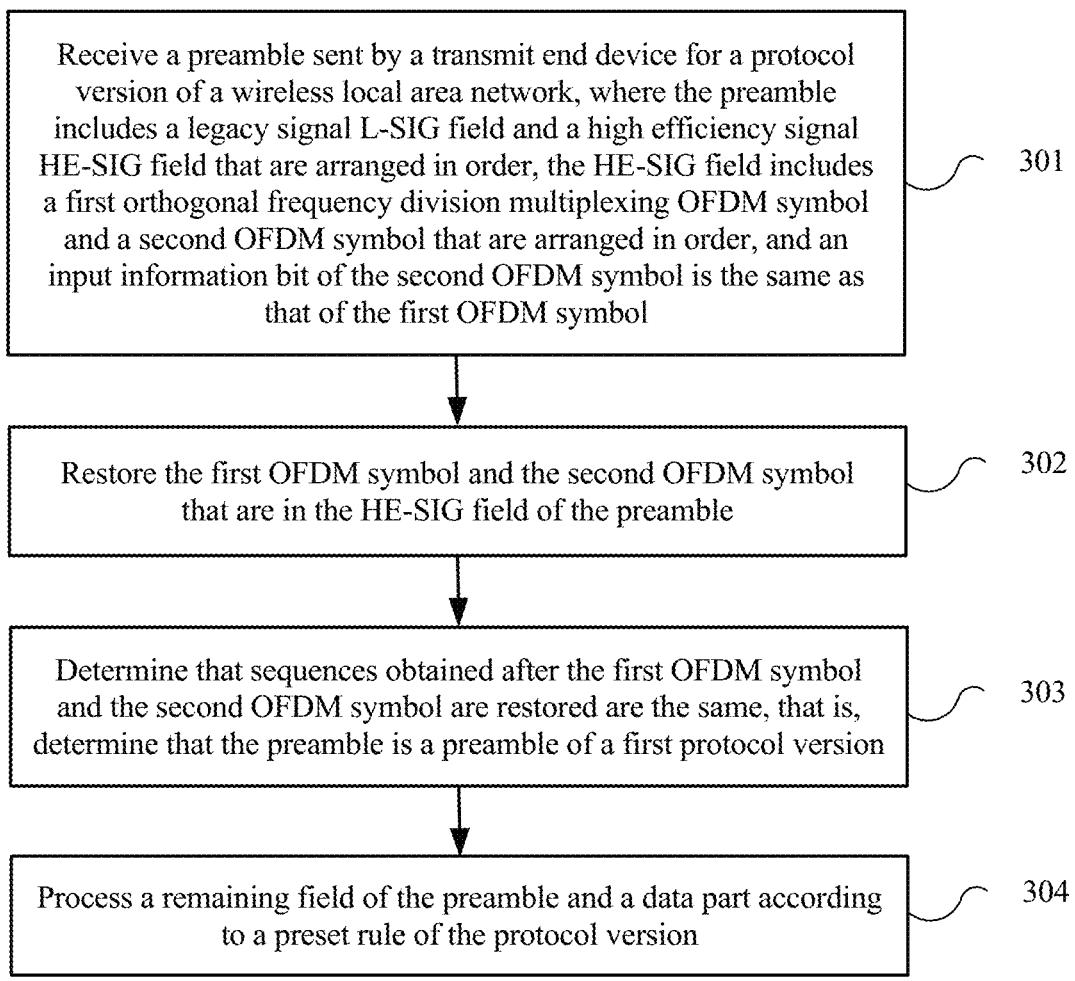
FIG. 3 is a schematic flowchart of a data transmission method according to an embodiment of the present invention.

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Technical solutions of the present invention may be applied to a wireless local area network (WLAN) system, a Wireless Fidelity (Wi-Fi) system, and various other communications systems that need to use a preamble to notify a communications peer end of information such as a data rate and a data length of transmitted data.

Correspondingly, a transmit end device and a receive end device may be a subscriber station (STA) in a WLAN. The subscriber station may also be referred to as a system, a subscriber unit, an access terminal, a mobile station, a mobile console, a remote station, a remote terminal, a mobile device, a user terminal, a terminal, a wireless communications device, a user agent, a user apparatus, or UE (User Equipment). The STA may be a cellular phone, a cordless phone, a Session Initiation Protocol (SIP) phone, a wireless local loop (WLL) station, a personal digital assistant (PDA), a handheld device having a wireless local area network (for example, Wi-Fi) communications function, a computing device, or another processing device connected to a wireless modem.

In addition, the transmit end device and the receive end device may be access points (Access Point) in a WLAN. The access point may be used to communicate with an access terminal by using the wireless local area network, transmit data of the access terminal to a network side or transmit data from a network side to the access terminal.

The receive end device may be a communications peer end corresponding to the transmit end device.

For ease of understanding and description, as an example but not limitation, the following describes execution processes and actions of the data transmission method and the apparatus of the present invention in a Wi-Fi system.

FIG. 1 is a structural diagram of a preamble according to an embodiment of the present invention.

As shown in FIG. 1, a legacy part of the preamble includes three fields: a legacy short training field (L-STF) field, a legacy long training field (L-LTF) field, and a legacy signal (L-SIG) field. The L-STF field is used in start-of-frame detection, an auto gain control (AGC) setting, initial frequency offset estimation, and initial time synchronization. The L-LTF is used in more accurate frequency offset estimation and time synchronization, and is also used to generate channel estimation for receiving and equalizing an L-SIG. The L-SIG field is mainly used to carry data rate information and data length information, so that the receive end device can determine, according to the data rate information and data length information, a length of data that is carried in a same frame with the preamble, and further determine proper idle time.

For an 802.11ax preamble, a non-legacy field of the preamble may be named as a high efficiency wireless local area network (HEW, High Efficiency WLAN) or high efficiency (HE), that is, a non-legacy field part includes: a high efficiency wireless local area network signal (HEW-SIG) field, a high efficiency wireless local area network short training (HEW-STF) field, and a high efficiency wireless local area network long training (HEW-LTF) field, or a high efficiency signal (HE-SIG) field, a high efficiency short training (HE-STF) field, and a high efficiency long training (HE-LTF) field. Naming of the non-legacy field of the 802.11ax preamble is not limited in the present invention, and for ease of description, the following embodiments mainly use the HE-SIG as an example for description.

As shown in FIG. 1, the L-SIG field in the legacy part of the preamble is followed by the HE-SIG field in the non-legacy part. The HE-SIG field may include at least two parts. A first part follows the L-SIG and includes at least two OFDM symbols, and a second part may follow the HE-STF and the HE-LTF. The HE-SIG field is used to carry signaling information in an 802.11ax version protocol, and can be used in identification and auto-detection of the 802.11ax preamble and a data packet.

FIG. 2 is a schematic flowchart of a data transmission method according to an embodiment of the present invention. The method in FIG. 2 may be executed by a transmit end device, and the transmit end device may be an access point AP, a station STA, or the like in a wireless local area network.

201. Generate a preamble for a protocol version of the wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the first OFDM symbol is the same as that of the second OFDM symbol.

202. Send the preamble to a receive end device, so that the receive end device restores the preamble, and when determining that input information bits obtained after restoring the first OFDM symbol and the second OFDM symbol are the same, determines that the preamble is the preamble of the protocol version.

When generating a preamble for a protocol version of a wireless local area network, the transmit end device in this embodiment of the present invention generates a first orthogonal frequency division multiplexing (OFDM) symbol and a second OFDM symbol according to a same input information bit, and input information bits obtained after a receive end device restores the first OFDM symbol and the second OFDM symbol can be the same, so that the receive end device determines that the preamble is the preamble of the protocol version, and rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence.

First, a transmit end device supporting a protocol version of the wireless local area network generates a to-be-transmitted preamble of the protocol version. Specifically, the transmit end device determines an original information bit that needs to be carried in each field of the preamble, and performs processing such as channel coding, interleaving, and modulation on the original information bit, so as to generate a preamble including multiple OFDM symbols. The following embodiment mainly describes a generation process of an HE-SIG field that follows a legacy signal field L-SIG field in the preamble of the protocol version. A generation process of a legacy part (an L-STF field, an L-LTF field, and the L-SIG field) of the preamble may be the same as that in an existing older version protocol (such as 802.11a/n/ac).

It should be understood that the HE-SIG field includes at least two parts. A first part immediately follows the L-SIG field, and a second part may be in any location of a non-legacy part. In a preferred embodiment, the second part may follow the HE-STF and the HE-LTF. This embodiment of the present invention mainly targets the first part of the HE-SIG field.

It should also be understood that this embodiment of the present invention does not limit a naming manner of the HE-SIG field, which may be high efficiency (HE, High Efficiency), a high efficiency wireless local area network (HEW, High Efficiency WLAN), or the like.

Optionally, in an embodiment, the generating a preamble for a protocol version of a wireless local area network includes: processing the input information bit by using a channel encoder, a first interleaver, and a first modulator to generate the first OFDM symbol, and processing the input information bit by using the channel encoder, a second interleaver, and a second modulator to generate the second OFDM symbol, where the first interleaver and the second interleaver are different, and the first modulator and the second modulator are the same or different.

When generating the HE-SIG field, the transmit end device may first determine an initial bit sequence according to signaling information that needs to be carried in the HE-SIG field, then generates an input information bit by sequentially capturing a bit sequence from the initial bit sequence according to a quantity of bits that can be carried in one OFDM symbol, and then processes the input information bit to generate the first OFDM symbol and the second OFDM symbol.

Specifically, the input information bit may be scrambled first, channel coding is performed by using the channel encoder, a sequence obtained after channel coding is interleaved by using the first interleaver and modulated by using the first modulator in a first modulation manner, and operations such as spatial flow shift, transformation to the time domain, and guard interval addition are performed, so as to generate the first OFDM symbol.

Similarly, the input information bit may be scrambled first, channel coding is performed by using the channel encoder, a sequence obtained after channel coding is interleaved by using the second interleaver and modulated by using the second modulator in a second modulation manner, and operations such as spatial flow shift, transformation to the time domain, and guard interval addition are performed, so as to generate the second OFDM symbol.

Both generation processes of the first OFDM symbol and the second OFDM symbol include interleaving processing, but the first interleaver and the second interleaver that perform interleaving processing are different. In addition, modulation manners of the first OFDM symbol and the second OFDM symbol may be the same or different, that is, the first modulator and the second modulator may be the same or different. In a preferred example, the modulation manner of the first OFDM symbol may be binary phase shift keying (BPSK), and the modulation manner of the second OFDM symbol may also be BPSK, or the modulation manner of the first OFDM symbol is BPSK, and the modulation manner of the second OFDM symbol is quadrature binary phase shift keying (QBPSK).

Optionally, in an embodiment, the generating a preamble for a protocol version of a wireless local area network includes: processing the input information bit by using a channel encoder, an interleaver, and a first modulator to generate the first OFDM symbol, and processing the input information bit by using the channel encoder and a second modulator to generate the second OFDM symbol, where the first modulator and the second modulator are the same or different. Specifically, a generation process of the first OFDM symbol may include interleaving processing, and a generation process of the second OFDM symbol may not include interleaving processing. Other processing processes are similar to those in the foregoing embodiment, and details are not described herein again.

Optionally, in an embodiment, the generating a preamble for a protocol version of a wireless local area network includes: processing the input information bit by using a channel encoder and a first modulator to generate the first OFDM symbol, and processing the input information bit by using the channel encoder, an interleaver, and a second modulator to generate the second OFDM symbol, where the first modulator and the second modulator are the same or different. Specifically, a generation process of the first OFDM symbol may not include interleaving processing, and a generation process of the second OFDM symbol may include interleaving processing. Other processing processes are similar to those in the foregoing embodiment, and details are not described herein again.

Optionally, in an embodiment, the generating a preamble for a protocol version of a wireless local area network includes: processing the input information bit by using a channel encoder and a first modulator to generate the first OFDM symbol, and processing the input information bit by using the channel encoder and a second modulator to generate the second OFDM symbol, where the first modulator and the second modulator are the same or different. Specifically, neither generation processes of the first OFDM symbol and the second OFDM symbol may include interleaving processing. Other processing processes are similar to those in the foregoing embodiment, and details are not described herein again.

Optionally, in an embodiment, the generating a preamble for a protocol version of a wireless local area network includes: processing the input information bit by using a channel encoder, an interleaver, and a first modulator to generate the first OFDM symbol, and processing the input information bit by using the channel encoder, an interleaver, and a second modulator to generate the second OFDM symbol, where the first modulator and the second modulator are the same or different. The first OFDM symbol and the second OFDM symbol pass a same interleaver. Other processing processes are similar to those in the foregoing embodiment, and details are not described herein again.

Optionally, in an embodiment, a subcarrier spacing used by the first OFDM symbol and the second OFDM symbol is 312.5 kHz, and a guard interval (GI) between the first OFDM symbol and the second OFDM symbol is 0.8 μs. It should be understood that, to ensure compatibility with an existing protocol version and unaffected performance of a receive end of the existing protocol version, an OFDM symbol in the HE-SIG field of the preamble may use a subcarrier spacing and a guard interval that are the same as those in the legacy field part.

Optionally, in an embodiment, a third OFDM symbol that follows the second OFDM symbol is generated, where an input information bit of the third OFDM symbol includes a part or all of information bits, except the input information bit of the first OFDM symbol or the second OFDM symbol, in information bits that need to be carried in the HE-SIG field, a subcarrier spacing used by the third symbol is 312.5 kHz, and a guard interval (GI) for the third OFDM symbol is 1.6 μs or 2.4 μs.

When the input information bit of the first OFDM symbol and the second OFDM symbol includes only a part of the information bits that need to be carried in the HE-SIG field, the part or all of the information bits, except the input information bit of the first OFDM symbol or the second OFDM symbol, in the information bits that need to be carried in the HE-SIG field may be carried in the third OFDM symbol.

That is, after the second OFDM symbol, the third OFDM symbol may be generated. Specifically, the input information bit of the third OFDM symbol may be scrambled first, channel coding is performed by using the channel encoder, a sequence obtained after channel coding is interleaved, by using the same first interleaver used by the first OFDM symbol, and modulated, and operations such as spatial flow shift, transformation to the time domain, and guard interval addition are performed, so as to generate the third OFDM symbol. Preferably, a modulation manner of the third OFDM symbol may be BPSK or QBPSK. The interleaving manner of the third OFDM symbol may be the same as or different from that of the first OFDM symbol, or may be the same as or different from that of the second OFDM symbol. The guard interval of the third OFDM symbol may be determined according to a protocol version of the foregoing preamble, that is, an 802.11ax protocol version may predefine a symbol that follows the first OFDM symbol and the second OFDM symbol, a field, and a guard interval of a data part. Preferably, the guard interval for the third OFDM symbol may be 1.6 μs or 2.4 μs.

Optionally, in an embodiment, the method further includes: generating a third OFDM symbol that follows the second OFDM symbol, where an input information bit of the third OFDM symbol includes a part or all of information bits, except the input information bit of the first OFDM symbol or the second OFDM symbol, in information bits that need to be carried in the HE-SIG field, and generating a fourth OFDM symbol that follows the third OFDM symbol, where an input information bit of the fourth OFDM symbol is the same as the input information bit of the third OFDM symbol, a subcarrier spacing used by the third OFDM symbol and the fourth OFDM symbol is 312.5 kHz, and a guard interval (GI) between the third OFDM symbol and the fourth OFDM symbol is 0.8 μs.

When the input information bit of the first OFDM symbol and the second OFDM symbol includes only a part of the information bits that need to be carried in the HE-SIG field, the part or all of the information bits, except the input information bit of the first OFDM symbol or the second OFDM symbol, in the information bits that need to be carried in the HE-SIG field may be carried in the third OFDM symbol and the fourth OFDM symbol. Generation processes of the third OFDM symbol and the fourth OFDM symbol may be similar to the generation processes of the first OFDM symbol and the second OFDM symbol, and details are not described herein. Preferably, interleaving and modulation manners of the third OFDM symbol are the same as those of the first OFDM symbol, and interleaving and modulation manners of the fourth OFDM symbol are the same as those of the second OFDM symbol.

When generating a preamble for a protocol version of a wireless local area network, the transmit end device in this embodiment of the present invention generates a first orthogonal frequency division multiplexing (OFDM) symbol and a second OFDM symbol according to a same input information bit, and input information bits obtained after a receive end device restores the first OFDM symbol and the second OFDM symbol can be the same, so that the receive end device determines that the preamble is the preamble of the protocol version, and rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence. In addition, a subcarrier spacing and a guard interval that are used by the first OFDM symbol and the second OFDM symbol are the same as a subcarrier spacing and a guard interval used in an existing protocol version. Therefore, normal reception of an 802.11ax preamble at a receive end of the existing protocol version can be ensured, not affecting performance of the receive end of the existing protocol version.

FIG. 3 is a schematic flowchart of a data transmission method according to an embodiment of the present invention. The method in FIG. 3 may be executed by a receive end device, and the receive end device may be an access point AP, a station STA, or the like in a wireless local area network.

301. Receive a preamble sent by a transmit end device for a protocol version of the wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the second OFDM symbol is the same as that of the first OFDM symbol.

302. Restore the first OFDM symbol and the second OFDM symbol that are in the HE-SIG field of the preamble.

303. Determine that sequences obtained after the first OFDM symbol and the second OFDM symbol are restored are the same, that is, determine that the preamble is a preamble of a first protocol version.

304. Process a remaining field of the preamble and a data part according to a predetermined rule of the protocol version.

The receive end device in this embodiment of the present invention receives a preamble sent by a transmit end device for a protocol version of a wireless local area network, restores a first OFDM symbol and a second OFDM symbol that are in an HE-SIG field of the preamble, and when determining that input information bits obtained after restoring the first OFDM symbol and the second OFDM symbol are the same, determines that the preamble is a preamble of a first protocol version. Rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence.

First, a transmit end device supporting a protocol version of the wireless local area network generates a to-be-transmitted preamble of the protocol version. Specifically, the transmit end device determines an original information bit that needs to be carried in each field of the preamble, and performs processing such as channel coding, interleaving, and modulation on the original information bit, so as to generate a preamble including multiple OFDM symbols.

The following embodiment mainly describes a restoration process of an HE-SIG field that follows a legacy signal (L-SIG) field in the preamble of the protocol version.

It should be understood that the HE-SIG field includes at least two parts. A first part immediately follows the L-SIG field, and a second part may be in any location of a non-legacy part. In a preferred embodiment, the second part may follow an HE-STF and an HE-LTF. This embodiment of the present invention mainly targets the first part of the HE-SIG field.

It should also be understood that this embodiment of the present invention does not limit a naming manner of the HE-SIG field, which may be high efficiency (HE, High Efficiency), high efficiency wireless local area network (HEW, High Efficiency WLAN), or the like.

Optionally, in an embodiment, the restoring the first OFDM symbol and the second OFDM symbol that are in the HE-SIG field of the preamble includes: processing the first OFDM symbol by using a first de-interleaver to generate a first sequence, and processing the second OFDM symbol by using a second de-interleaver to generate a second sequence, so as to determine that the first sequence is the same as the second sequence, that is, to determine that the preamble is the preamble of the first protocol version, where the first de-interleaver and the second de-interleaver are different.

When generating the HE-SIG field of the preamble, the transmit end device generates the first OFDM symbol and the second OFDM symbol according to a same input bit sequence. A process in which the receive end restores the first OFDM symbol and the second OFDM symbol may be considered as an inverse process of a generation process performed by the transmit end device, that is, demodulation, de-interleaving, and decoding that are performed on the first OFDM symbol and the second OFDM symbol by the receive end device are corresponding to modulation, interleaving, and encoding that are performed on the first OFDM symbol and the second OFDM symbol by the transmit end device. Specifically, the transmit end device generates the first OFDM symbol by using an encoder, a first modulator, and a first interleaver. A modulation manner corresponding to the first modulator may be BPSK. Correspondingly, when restoring the first OFDM symbol, the receive end device needs to de-interleave the first OFDM symbol by using a first de-interleaver corresponding to the first interleaver. The transmit end device generates the second OFDM symbol by using the same encoder and first modulator that are used for the first OFDM symbol, and by using a second interleaver that is different from the first interleaver used for the first OFDM symbol. Correspondingly, when restoring the second OFDM symbol, the receive end device needs to de-interleave the first OFDM symbol by using a second de-interleaver corresponding to the second interleaver. Then the de-interleaved first OFDM symbol is compared with the de-interleaved second OFDM symbol, and if sequences are the same, the preamble may be determined as an 802.11ax preamble.

Optionally, in an embodiment, the restoring the first OFDM symbol and the second OFDM symbol that are in the HE-SIG field of the preamble includes: processing the first OFDM symbol by using a first demodulator and a de-interleaver to generate a first sequence, and processing the second OFDM symbol by using a second demodulator to generate a second sequence, so as to determine that the first sequence is the same as the second sequence, that is, to determine that the preamble is the preamble of the first protocol version, where the first demodulator and the second demodulator are the same or different.

Specifically, the transmit end device generates the first OFDM symbol by using an encoder, a first modulator, and an interleaver. A modulation manner corresponding to the first modulator may be BPSK. Correspondingly, when restoring the first OFDM symbol, the receive end device needs to de-interleave the first OFDM symbol by using a de-interleaver corresponding to the interleaver. The transmit end device generates the second OFDM symbol by using the same encoder and second modulator that are used to generate the first OFDM symbol, and interleaving is not performed. A modulation manner corresponding to the second modulator may be QBPSK. Correspondingly, when restoring the second OFDM symbol, the receive end device needs to rotate the OFDM symbol 90 degrees clockwise by using the second demodulator. Then the de-interleaved first OFDM symbol is compared with the de-interleaved second OFDM symbol, and if sequences are the same, the preamble may be determined as an 802.11ax preamble.

Optionally, in an embodiment, the restoring the first OFDM symbol and the second OFDM symbol that are in the HE-SIG field of the preamble includes: processing the first OFDM symbol by using a first demodulator to generate a first sequence, and processing the second OFDM symbol by using a second demodulator and a de-interleaver to generate a second sequence, so as to determine that the first sequence is the same as the second sequence, that is, to determine that the preamble is the preamble of the first protocol version, where the first demodulator and the second demodulator are the same or different.

Specifically, the transmit end device generates the first OFDM symbol by using an encoder and a first modulator, and interleaving is not performed. A modulation manner corresponding to the first modulator may be BPSK. The transmit end device generates the second OFDM symbol by using an encoder, a second modulator, and an interleaver. A modulation manner corresponding to the second modulator may be QBPSK. Correspondingly, when restoring the second OFDM symbol, the receive end device needs to de-interleave the second OFDM symbol by using a de-interleaver corresponding to the interleaver and perform phase rotation on the second OFDM symbol by 90 degrees clockwise by using the second demodulator. Then the processed first OFDM symbol is compared with the de-interleaved and demodulated second OFDM symbol, and if sequences are the same, the preamble may be determined as an 802.11ax preamble.

Optionally, in an embodiment, the restoring the first OFDM symbol and the second OFDM symbol that are in the HE-SIG field of the preamble includes: processing the first OFDM symbol by using a first demodulator to generate a first sequence, and processing the second OFDM symbol by using a second demodulator to generate a second sequence, so as to determine that the first sequence is the same as the second sequence, that is, to determine that the preamble is the preamble of the first protocol version, where the first demodulator and the second demodulator are the same or different.

Optionally, in an embodiment, the restoring the first OFDM symbol and the second OFDM symbol that are in the HE-SIG field of the preamble includes: processing the first OFDM symbol by using a de-interleaver to generate a first sequence, and processing the second OFDM symbol by using the de-interleaver to generate a second sequence, so as to determine that the first sequence is the same as the second sequence, that is, to determine that the preamble is the preamble of the first protocol version.

Optionally, in an embodiment, a subcarrier spacing used by the first OFDM symbol and the second OFDM symbol is 312.5 kHz, and a guard interval (GI) between the first OFDM symbol and the second OFDM symbol is 0.8 µs.

The receive end device in this embodiment of the present invention receives a preamble sent by a transmit end device for a protocol version of a wireless local area network, restores a first OFDM symbol and a second OFDM symbol that are in an HE-SIG field of the preamble, and when determining that input information bits obtained after restoring the first OFDM symbol and the second OFDM symbol are the same, determines that the preamble is a preamble of a first protocol version. Rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence. In addition, a subcarrier spacing and a guard interval that are used by the first OFDM symbol and the second OFDM symbol are the same as a subcarrier spacing and a guard interval used in an existing protocol version. Therefore, normal reception of an 802.11ax preamble at a receive end of the existing protocol version can be ensured, not affecting performance of the receive end of the existing protocol version.

FIG. 4 is a schematic structural diagram of a preamble according to an embodiment of the present invention.

In a preferred embodiment, an 802.11ax transmit end may generate the preamble shown in FIG. 4. A legacy part of the preamble includes three fields: an L-STF, an L-LTF, and an L-SIG, and the three fields of the legacy part occupy 20 µs in total. A first part of an HE-SIG field follows the L-SIG field and is denoted as HE-SIG1, and a second part following an HE-LTF or in any other location of the HE-SIG field is denoted as HE-SIG2. An HE-SIG1 part includes two OFDM symbols: a first OFDM symbol and a second OFDM symbol. It should be understood that when the first part of the HE-SIG field includes at least two OFDM symbols, the first two OFDM symbols may be denoted as HE-SIG0, a remaining symbol except the first two OFDM symbols in the first part may be denoted as HE-SIG1, and the second part of the HE-SIG field may be denoted as HE-SIG2.

The first OFDM symbol uses a subcarrier spacing of 312.5 kHz and a guard interval of 0.8 µs. An input information bit carried in the first OFDM symbol goes through a channel encoder and a first interleaver, and is modulated by using BPSK.

The second OFDM symbol also uses the subcarrier spacing of 312.5 kHz and the guard interval of 0.8 µs. An input information bit of the second OFDM symbol is the same as that of the first OFDM symbol, and is processed by using the channel encoder and a second interleaver and then modulated by using the BPSK.

A subsequent OFDM symbol (including a remaining field of the preamble and a data part) following the second OFDM symbol may use a subcarrier spacing of 312.5 kHz or another value and a guard interval of 0.8 µs or another value according to a rule of 802.11ax.

After receiving the foregoing preamble, a receive end device may perform channel equalization on the first OFDM symbol and the second OFDM symbol that follow the L-SIG field, so as to obtain a first frequency domain sequence and a second frequency domain sequence, respectively, and cache the first frequency domain sequence and the second frequency domain sequence for subsequent processing. Then the first frequency domain sequence is de-interleaved by using a first (de-)interleaver to obtain a third frequency domain sequence, and the second frequency domain sequence is de-interleaved by using a second (de-)interleaver to obtain a fourth frequency domain sequence. Then it is determined through comparison whether information carried in a subcarrier corresponding to the third frequency domain sequence is the same as information carried in a subcarrier corresponding to the fourth frequency domain sequence. If the information is the same, the preamble is determined as an 802.11ax preamble, and subsequent data is determined as a data packet of 802.11ax. If the information is not the same, a protocol version of the preamble is identified by using an existing method for automatically detecting a protocol version.

When an 802.11n/ac receive end receives the foregoing 802.11ax preamble, because both the two OFDM symbols following the L-SIG field are modulated by using the BPSK, the 802.11n/ac receive end identifies a preamble and data of 802.11ax as a preamble and data of 802.11a, thereby not affecting performance and compatibility of the 802.11n/ac receive end.

Rapid and reliable auto-detection of a preamble of an 802.11ax version can be implemented by an 802.11ax receive end by using the method according to the embodiments of the present invention. In addition, when 802.11ax is applied to an outdoor scenario, reliability and correctness of preamble transmission and auto-detection may be improved by using the first OFDM symbol and the second OFDM symbol that include a same input information bit. In addition, a subcarrier spacing and a guard interval that are used by the first OFDM symbol and the second OFDM symbol are the same as a subcarrier spacing and a guard interval used in an existing protocol version, and both the first OFDM symbol and the second OFDM symbol are modulated by using BPSK. Therefore, normal reception of an 802.11ax preamble at a receive end of the existing protocol version can be ensured, not affecting performance of the receive end of the existing protocol version.

FIG. 5 is a schematic structural diagram of a preamble according to another embodiment of the present invention.

An 802.11ax transmit end may generate the preamble shown in FIG. 5. A first part of an HE-SIG field follows the L-SIG field and is denoted as HE-SIG1, and a second part of the HE-SIG field follows an HE-STF and an HE-LTF and is denoted as HE-SIG2. An HE-SIG1 part includes two OFDM symbols: a first OFDM symbol and a second OFDM symbol. It should be understood that when the first part of the HE-SIG field includes at least two OFDM symbols, the first two OFDM symbols may be denoted as HE-SIG0, a remaining symbol except the first two OFDM symbols in the first part may be denoted as HE-SIG1, and the second part of the HE-SIG field may be denoted as HE-SIG2.

The first OFDM symbol uses a subcarrier spacing of 312.5 kHz and a guard interval of 0.8 µs. An input information bit carried in the first OFDM symbol goes through a channel encoder and a first interleaver, and is modulated by using BPSK.

The second OFDM symbol also uses the subcarrier spacing of 312.5 kHz and the guard interval of 0.8 µs. An input information bit of the second OFDM symbol is the same as that of the first OFDM symbol, and is processed by using the channel encoder and then modulated by using QBPSK without being interleaved.

A subsequent OFDM symbol (including a remaining field of the preamble and a data part) following the second OFDM symbol may use a subcarrier spacing of 312.5 kHz or another value and a guard interval of 0.8 µs or another value according to a rule of 802.11ax.

After receiving the foregoing preamble, a receive end device may perform channel equalization on the first OFDM symbol and the second OFDM symbol that follow the L-SIG field, so as to obtain a first frequency domain sequence and a second frequency domain sequence, respectively, and cache the first frequency domain sequence and the second frequency domain sequence for subsequent processing. Then the first frequency domain sequence is de-interleaved by using a first (de-)interleaver to obtain a third frequency domain sequence. A modulation manner of the second OFDM symbol is QBPSK, and as shown in the lower part of FIG. 5, constellation mapping in QBPSK modulation is phase-rotated by 90 degrees counterclockwise relative to that in BPSK modulation. Therefore, when restoring the second OFDM symbol, the receive end needs to perform phase rotation on the foregoing second frequency domain sequence by 90 degrees clockwise to obtain a fourth frequency domain sequence.

Then it is determined through comparison whether information carried in a subcarrier corresponding to the third frequency domain sequence is the same as information carried in a subcarrier corresponding to the fourth frequency domain sequence. If the information is the same, the preamble is determined as an 802.11ax preamble, and subsequent data is determined as a data packet of 802.11ax. If the information is not the same, a protocol version of the preamble is identified by using an existing method for automatically detecting a protocol version. The subsequent OFDM symbol (including a remaining part of the preamble and a data part) may be processed according to a rule of an 802.11ax protocol, and a subcarrier spacing and a guard interval that are corresponding to the transmit end.

When an 802.11n receive end receives the foregoing 802.11ax preamble, because a first OFDM symbol that follows the L-SIG field is modulated by using the BPSK, the 802.11n receive end identifies the 802.11ax preamble as an 802.11a preamble and processes the 802.11ax preamble in a manner of processing the 802.11a preamble, thereby not affecting performance and compatibility of the receive end.

When an 802.11ac receive end receives the foregoing 802.11ax preamble, because the first OFDM symbol that follows the L-SIG field is modulated by using the BPSK and a second OFDM symbol is modulated by using the QBPSK, the 802.11ac receive end identifies the 802.11ax preamble as an 802.11ac preamble and processes the 802.11ax preamble in a manner of processing the 802.11ac preamble. A cyclic redundancy check (CRC) verification failure is caused by decoding the HE-SIG field by the 802.11ac receive end in a manner of decoding a VHT-SIG field. Therefore, backoff is performed according to a data length indicated in the L-SIG field, not affecting performance and compatibility of the 802.11ac receive end.

Figure 6A:
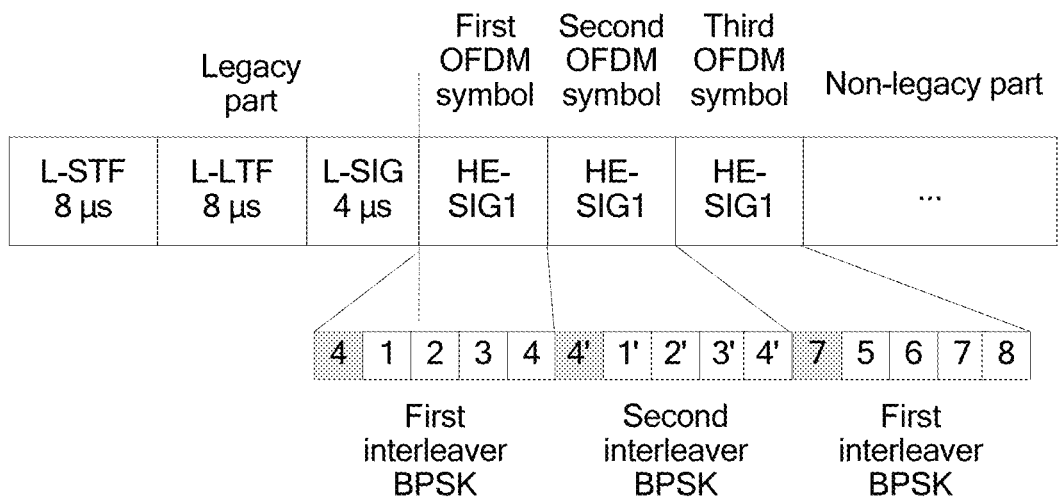
FIG. 6*a* and FIG. 6*b* are schematic structural diagrams of a preamble according to another embodiment of the present invention.
Figure 6B:
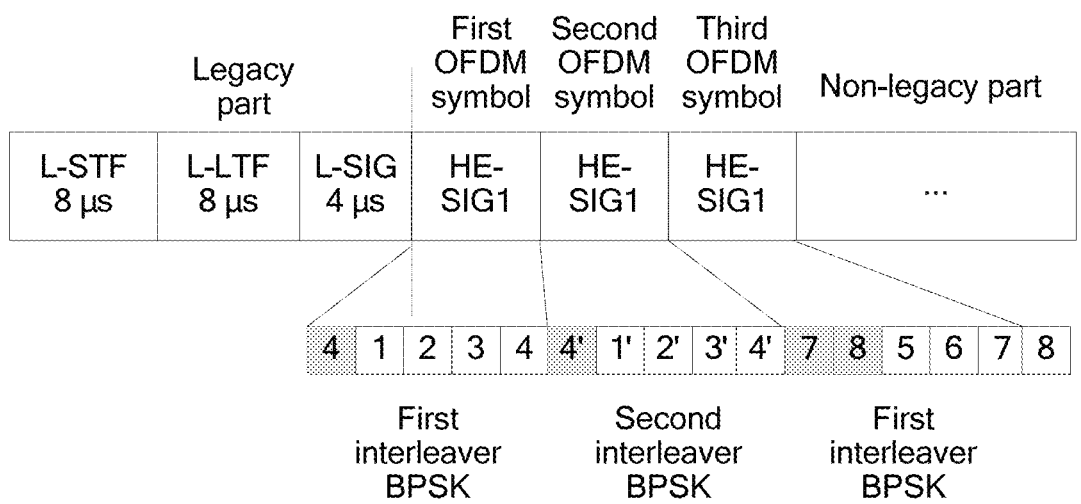

FIG. 6a and FIG. 6b are schematic structural diagrams of a preamble according to another embodiment of the present invention.

In an embodiment, an 802.11ax transmit end can generate the preambles shown in FIG. 6a and FIG. 6b. A legacy part of the preamble includes three fields: an L-STF, an L-LTF, and an L-SIG, and the three fields of the legacy part occupy 20 µs in total. A first part of an HE-SIG field follows the L-SIG field and is denoted as HE-SIG1, and a second part of the HE-SIG field follows an HE-STF and an HE-LTF and is denoted as HE-SIG2. It should be understood that when the first part of the HE-SIG field includes at least two OFDM symbols, the first two OFDM symbols may be denoted as HE-SIG0, a remaining symbol except the first two OFDM symbols in the first part may be denoted as HE-SIG1, and the second part of the HE-SIG field may be denoted as HE-SIG2.

As shown in FIG. 6a and FIG. 6b, the first part of the HE-SIG field includes three OFDM symbols. A first OFDM symbol uses a subcarrier spacing of 312.5 kHz and a guard interval of 0.8 µs. An input information bit carried in the first OFDM symbol goes through a channel encoder and a first interleaver, and is modulated by using BPSK. A second OFDM symbol also uses the subcarrier spacing of 312.5 kHz and the guard interval of 0.8 µs. An input information bit of the second OFDM symbol is the same as that of the first OFDM symbol, and is processed by using the channel encoder and a second interleaver and then modulated by using the BPSK.

A third OFDM symbol may use a subcarrier spacing of 312.5 kHz or another value and a guard interval of 0.8 µs or another value. For example, the guard interval of the third OFDM symbol shown in FIG. 6b is implemented by using different cyclic prefixes. A grey signal in the figure is a cyclic prefix, and lengths of cyclic prefixes of the first OFDM symbol and the second OFDM symbol are different from a length of a cyclic prefix of the third OFDM symbol. An input information bit of the third OFDM symbol is different from the input information bit of the first OFDM symbol and the second OFDM symbol, and is a part or all of bit sequences, except the input information bit of the first OFDM symbol and the second OFDM symbol, in original information bits that need to be carried in the HE-SIG field.

An input bit sequence of the third OFDM symbol is processed by using the channel encoder and the first interleaver and modulated by using the BPSK.

After receiving the foregoing preamble, a receive end device may perform channel equalization on the first OFDM symbol and the second OFDM symbol that follow the L-SIG field, so as to obtain a first frequency domain sequence and a second frequency domain sequence, respectively, and cache the first frequency domain sequence and the second frequency domain sequence for subsequent processing. Then the first frequency domain sequence is de-interleaved by using a first (de-)interleaver to obtain a third frequency domain sequence, and the second frequency domain sequence is de-interleaved by using a second (de-)interleaver to obtain a fourth frequency domain sequence. Then it is determined through comparison whether information carried in a subcarrier corresponding to the third frequency domain sequence is the same as information carried in a subcarrier corresponding to the fourth frequency domain sequence. If the information is the same, the preamble is determined as an 802.11ax preamble, and subsequent data is determined as a data packet of 802.11ax. If the information is not the same, a protocol version of the preamble is identified by using an existing method for automatically detecting a protocol version.

When an 802.11n/ac receive end receives the foregoing 802.11ax preamble, because both the two OFDM symbols following the L-SIG field are modulated by using the BPSK, the 802.11n/ac receive end identifies a preamble and data of 802.11ax as a preamble and data of 802.11a, not affecting performance and compatibility of the 802.11n/ac receive end as well.

Figure 7:
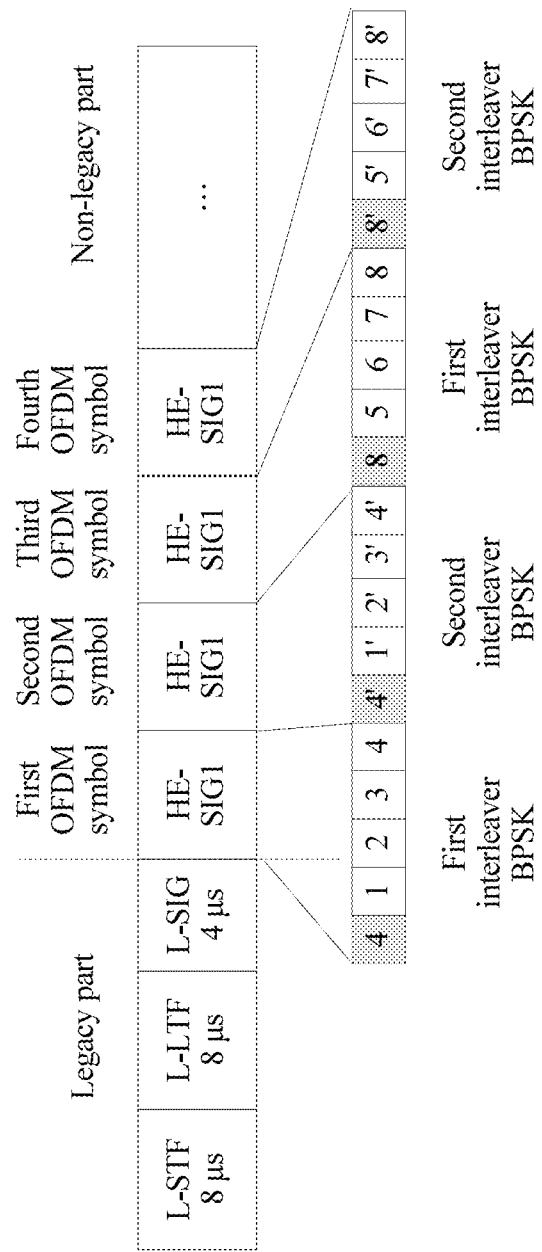
FIG. 7 is a schematic structural diagram of a preamble according to another embodiment of the present invention.

FIG. 7 is a schematic structural diagram of a preamble according to another embodiment of the present invention.

An 802.11ax transmit end may generate the preamble shown in FIG. 7. A legacy part of the preamble includes three fields: an L-STF, an L-LTF, and an L-SIG, and the three fields of the legacy part occupy 20 µs in total. A first part of an HE-SIG field follows the L-SIG field and is denoted as HE-SIG1, and a second part of the HE-SIG field follows an HE-STF and an HE-LTF and is denoted as HE-SIG2. It should be understood that when the first part of the HE-SIG field includes at least two OFDM symbols, the first two OFDM symbols may be denoted as HE-SIG0, a remaining symbol except the first two OFDM symbols in the first part may be denoted as HE-SIG1, and the second part of the HE-SIG field may be denoted as HE-SIG2.

As shown in FIG. 7, a first OFDM symbol in the HE-SIG field uses a subcarrier spacing of 312.5 kHz and a guard interval of 0.8 µs. An input information bit carried in the first OFDM symbol goes through a channel encoder and a first interleaver, and is modulated by using BPSK. A second OFDM symbol also uses the subcarrier spacing of 312.5 kHz and the guard interval of 0.8 µs. An input information bit of the second OFDM symbol is the same as that of the first OFDM symbol, and is processed by using the channel encoder and a second interleaver and then modulated by using the BPSK.

A third OFDM symbol uses the subcarrier spacing of 312.5 kHz and the guard interval of 0.8 µs. An input information bit carried in the third OFDM symbol is processed by using the channel encoder and the first interleaver and modulated by using the BPSK. A fourth OFDM symbol also uses the subcarrier spacing of 312.5 kHz and the guard interval of 0.8 µs. An input information bit of the fourth OFDM symbol is the same as that of the third OFDM symbol, and is processed by using the channel encoder and the second interleaver and then modulated by using the BPSK. The input information bit of the third OFDM symbol and the fourth OFDM symbol is different from the input information bit of the first OFDM symbol and the second OFDM symbol.

Another symbol (including a remaining field of the preamble and a data part) following the fourth OFDM symbol may use a subcarrier spacing of 312.5 kHz or another value and a guard interval of 0.8 µs or another value.

After receiving the foregoing preamble, a receive end device may perform channel equalization on the first OFDM symbol and the second OFDM symbol that follow the L-SIG field, so as to obtain a first frequency domain sequence and a second frequency domain sequence, respectively, and cache the first frequency domain sequence and the second frequency domain sequence for subsequent processing. Then the first frequency domain sequence is de-interleaved by using a first (de-)interleaver to obtain a third frequency domain sequence, and the second frequency domain sequence is de-interleaved by using a second (de-)interleaver to obtain a fourth frequency domain sequence. Then it is determined through comparison whether information carried in a subcarrier corresponding to the third frequency domain sequence is the same as information carried in a subcarrier corresponding to the fourth frequency domain sequence. If the information is the same, the preamble is determined as an 802.11ax preamble, and subsequent data is determined as a data packet of 802.11ax. If the information is not the same, a protocol version of the preamble is identified by using an existing method for automatically detecting a protocol version.

When an 802.11n/ac receive end receives the foregoing 802.11ax preamble, because both the two OFDM symbols following the L-SIG field are modulated by using the BPSK, the 802.11n/ac receive end identifies a preamble and data of 802.11ax as a preamble and data of 802.11a, and performance and compatibility of the 802.11n/ac receive end are also unaffected.

Figure 8:
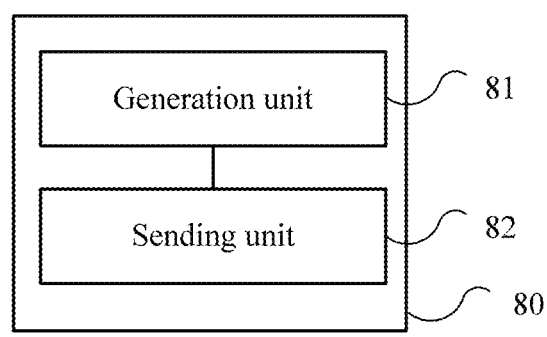
FIG. 8 is a schematic block diagram of a transmit end device according to an embodiment of the present invention.

FIG. 8 is a schematic block diagram of a transmit end device according to an embodiment of the present invention. A transmit end device 80 in FIG. 8 includes a generation unit 81 and a sending unit 82.

The generation unit 81 generates a preamble for a protocol version of a wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the first OFDM symbol is the same as that of the second OFDM symbol. The sending unit 82 sends the preamble to a receive end device.

When generating a preamble for a protocol version of a wireless local area network, the transmit end device 80 in this embodiment of the present invention generates a first orthogonal frequency division multiplexing (OFDM) symbol and a second OFDM symbol according to a same input information bit, and input information bits obtained after a receive end device restores the first OFDM symbol and the second OFDM symbol can be the same, so that the receive end device determines that the preamble is the preamble of the protocol version, and rapid and reliable auto-detection of the 802.11ax version preamble can be implemented. In addition, when 802.11ax is applied to an outdoor scenario, reliability and correctness of preamble transmission and auto-detection may be improved by using the first OFDM symbol and the second OFDM symbol that include a same bit sequence.

First, a transmit end device supporting a protocol version of the wireless local area network generates a to-be-transmitted preamble of the protocol version. Specifically, the transmit end device determines an original information bit that needs to be carried in each field of the preamble, and performs processing such as channel coding, interleaving, and modulation on the original information bit, so as to generate a preamble including multiple OFDM symbols. The following embodiment mainly describes a generation process of an HE-SIG field that follows a legacy signal field L-SIG field in the preamble of the protocol version. A generation process of a legacy part (an L-STF field, an L-LTF field, and the L-SIG field) of the preamble may be the same as that in an existing older version protocol (such as 802.11a/n/ac).

It should be understood that the HE-SIG field includes at least two parts. A first part immediately follows the L-SIG field, and a second part may be in any location of a non-legacy part. In a preferred embodiment, the second part may follow the HE-STF and the HE-LTF. This embodiment of the present invention mainly targets the first part of the HE-SIG field.

It should also be understood that this embodiment of the present invention does not limit a naming manner of the HE-SIG field, which may be high efficiency (HE, High Efficiency), high efficiency wireless local area network (HEW, High Efficiency WLAN), or the like.

Optionally, in an embodiment, the generation unit 81 is specifically configured to process the input information bit by using a channel encoder, a first interleaver, and a first modulator to generate the first OFDM symbol, and process the input information bit by using the channel encoder, a second interleaver, and a second modulator to generate the second OFDM symbol, where the first interleaver and the second interleaver are different, and the first modulator and the second modulator are the same or different.

When generating the HE-SIG field, the transmit end device 80 may first determine an initial bit sequence according to signaling information that needs to be carried in the HE-SIG field, then generates an input information bit by sequentially capturing a bit sequence from the initial bit sequence according to a quantity of bits that can be carried in one OFDM symbol, and then processes the input information bit to generate the first OFDM symbol and the second OFDM symbol.

Specifically, the input information bit may be scrambled first, channel coding is performed by using the channel encoder, a sequence obtained after channel coding is interleaved by using the first interleaver and modulated by using the first modulator in a first modulation manner, and operations such as spatial flow shift, transformation to the time domain, and guard interval addition are performed, so as to generate the first OFDM symbol.

Similarly, the input information bit may be scrambled first, channel coding is performed by using the channel encoder, a sequence obtained after channel coding is interleaved by using the second interleaver and modulated by using the second modulator in a second modulation manner, and operations such as spatial flow shift, transformation to the time domain, and guard interval addition are performed, so as to generate the second OFDM symbol.

Both generation processes of the first OFDM symbol and the second OFDM symbol include interleaving processing, but the first interleaver and the second interleaver that perform interleaving processing are different. In addition, modulation manners of the first OFDM symbol and the second OFDM symbol may be the same or different, that is, the first modulator and the second modulator may be the same or different. In a preferred example, the modulation manner of the first OFDM symbol may be BPSK, and the modulation manner of the second OFDM symbol may also be BPSK, or the modulation manner of the first OFDM symbol is BPSK, and the modulation manner of the second OFDM symbol is QBPSK.

Optionally, in an embodiment, the generation unit 81 is specifically configured to process the input information bit by using a channel encoder, an interleaver, and a first modulator to generate the first OFDM symbol, and process the input information bit by using the channel encoder and a second modulator to generate the second OFDM symbol, where the first modulator and the second modulator are the same or different. Specifically, a generation process of the first OFDM symbol may include interleaving processing, and a generation process of the second OFDM symbol may not include interleaving processing. Other processing processes are similar to those in the foregoing embodiment, and details are not described herein again.

Optionally, in an embodiment, the generation unit 81 is specifically configured to process the input information bit by using a channel encoder and a first modulator to generate the first OFDM symbol, and process the input information bit by using the channel encoder, an interleaver, and a second modulator to generate the second OFDM symbol, where the first modulator and the second modulator are the same or different. Specifically, a generation process of the first OFDM symbol may not include interleaving processing, and a generation process of the second OFDM symbol may include interleaving processing. Other processing processes are similar to those in the foregoing embodiment, and details are not described herein again.

Optionally, in an embodiment, the generation unit 81 is specifically configured to process the input information bit by using a channel encoder and a first modulator to generate the first OFDM symbol, and process the input information bit by using the channel encoder and a second modulator to generate the second OFDM symbol, where the first modulator and the second modulator are the same or different. Specifically, generation processes of the first OFDM symbol and the second OFDM symbol may neither include interleaving processing. Other processing processes are similar to those in the foregoing embodiment, and details are not described herein again.

Optionally, in an embodiment, the generation unit 81 is specifically configured to process the input information bit by using a channel encoder, an interleaver, and a first modulator to generate the first OFDM symbol, and process the input information bit by using the channel encoder, the interleaver, and a second modulator to generate the second OFDM symbol, where the first modulator and the second modulator are the same or different. The first OFDM symbol and the second OFDM symbol pass a same interleaver. Other processing processes are similar to those in the foregoing embodiment, and details are not described herein again.

Optionally, in an embodiment, a subcarrier spacing used by the first OFDM symbol and the second OFDM symbol is 312.5 kHz, and a guard interval (GI) between the first OFDM symbol and the second OFDM symbol is 0.8 µs. It should be understood that, to ensure compatibility with an existing protocol version and unaffected performance of a receive end of the existing protocol version, an OFDM symbol in the HE-SIG field of the preamble may use a subcarrier spacing and a guard interval that are the same as those in the legacy field part.

Optionally, in an embodiment, the generation unit 81 is further configured to generate a third OFDM symbol that follows the second OFDM symbol, where an input information bit of the third OFDM symbol includes a part or all of information bits, except the input information bit of the first OFDM symbol or the second OFDM symbol, in information bits that need to be carried in the HE-SIG field, a subcarrier spacing used by the third symbol is 312.5 kHz, and a guard interval (GI) for the third OFDM symbol is 1.6 µs or 2.4 µs.

When the input information bit of the first OFDM symbol and the second OFDM symbol includes only a part of the information bits that need to be carried in the HE-SIG field, the part or all of the information bits, except the input information bit of the first OFDM symbol or the second OFDM symbol, in the information bits that need to be carried in the HE-SIG field may be carried in the third OFDM symbol.

That is, the third OFDM symbol that follows the second OFDM symbol may be generated. Specifically, the input information bit of the third OFDM symbol may be scrambled first, channel coding is performed by using the channel encoder, a sequence obtained after channel coding is interleaved, by using the same first interleaver used by the first OFDM symbol, and modulated, and operations such as spatial flow shift, transformation to the time domain, and guard interval addition are performed, so as to generate the third OFDM symbol. Preferably, a modulation manner of the third OFDM symbol may be BPSK or QBPSK. The interleaving manner of the third OFDM symbol may be the same as or different from that of the first OFDM symbol, or may be the same as or different from that of the second OFDM symbol. The guard interval of the third OFDM symbol may be determined according to a protocol version of the foregoing preamble, that is, an 802.11ax protocol version may predefine a symbol that follows the first OFDM symbol and the second OFDM symbol, a field, and a guard interval of a data part. Preferably, the guard interval for the third OFDM symbol may be 1.6 µs or 2.4 µs.

Optionally, in an embodiment, the generation unit 81 is further configured to: generate a third OFDM symbol that follows the second OFDM symbol, where an input information bit of the third OFDM symbol includes a part or all of information bits, except the input information bit of the first OFDM symbol or the second OFDM symbol, in information bits that need to be carried in the HE-SIG field, and generate a fourth OFDM symbol that follows the third OFDM symbol, where an input information bit of the fourth OFDM symbol is the same as the input information bit of the third OFDM symbol, a subcarrier spacing used by the third OFDM symbol and the fourth OFDM symbol is 312.5 kHz, and a guard interval (GI) between the third OFDM symbol and the fourth OFDM symbol is 0.8 µs.

When the input information bit of the first OFDM symbol and the second OFDM symbol includes only a part of the information bits that need to be carried in the HE-SIG field, the part or all of the information bits, except the input information bit of the first OFDM symbol or the second OFDM symbol, in the information bits that need to be carried in the HE-SIG field may be carried in the third OFDM symbol and the fourth OFDM symbol. Generation processes of the third OFDM symbol and the fourth OFDM symbol may be similar to the generation processes of the first OFDM symbol and the second OFDM symbol, and details are not described herein. Preferably, interleaving and modulation manners of the third OFDM symbol are the same as those of the first OFDM symbol, and interleaving and modulation manners of the fourth OFDM symbol are the same as those of the second OFDM symbol.

When generating a preamble for a protocol version of a wireless local area network, the transmit end device 80 in this embodiment of the present invention generates a first orthogonal frequency division multiplexing (OFDM) symbol and a second OFDM symbol according to a same input information bit, and input information bits obtained after a receive end device restores the first OFDM symbol and the second OFDM symbol can be the same, so that the receive end device determines that the preamble is the preamble of the protocol version, and rapid and reliable auto-detection of the 802.11ax version preamble can be implemented. In addition, when 802.11ax is applied to an outdoor scenario, reliability and correctness of preamble transmission and auto-detection may be improved by using the first OFDM symbol and the second OFDM symbol that include a same bit sequence. In addition, a subcarrier spacing and a guard interval that are used by the first OFDM symbol and the second OFDM symbol are the same as a subcarrier spacing and a guard interval used in an existing protocol version. Therefore, normal reception of an 802.11ax preamble at a receive end of the existing protocol version can be ensured, not affecting performance of the receive end of the existing protocol version.

Figure 9:
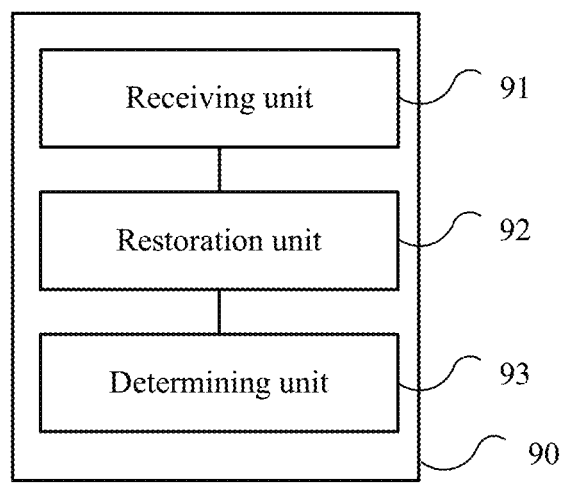
FIG. 9 is a schematic block diagram of a receive end device according to an embodiment of the present invention.

FIG. 9 is a schematic block diagram of a receive end device according to an embodiment of the present invention. A receive end device 90 in FIG. 9 includes a receiving unit 91, a restoration unit 92, and a determining unit 93.

The receiving unit 91 receives a preamble sent by a transmit end device for a protocol version of a wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the second OFDM symbol is the same as that of the first OFDM symbol. The restoration unit 92 restores the first OFDM symbol and the second OFDM symbol that are in the HE-SIG field of the preamble. The determining unit 93 determines that input information bits obtained after the first OFDM symbol and the second OFDM symbol are restored are the same, that is, determines that the preamble is a preamble of a first protocol version. The restoration unit 92 processes a remaining field of the preamble and a data part according to a predetermined rule of the protocol version.

The receive end device 90 in this embodiment of the present invention receives a preamble sent by the transmit end device 80 for a protocol version of a wireless local area network, restores a first OFDM symbol and a second OFDM symbol that are in an HE-SIG field of the preamble, and when determining that input information bits obtained after restoring the first OFDM symbol and the second OFDM symbol are the same, determines that the preamble is a preamble of a first protocol version. Rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence.

First, a transmit end device supporting a protocol version of the wireless local area network generates a to-be-transmitted preamble of the protocol version. Specifically, the transmit end device determines an original information bit that needs to be carried in each field of the preamble, and performs processing such as channel coding, interleaving, and modulation on the original information bit, so as to generate a preamble including multiple OFDM symbols. The following embodiment mainly describes a restoration process of an HE-SIG field that follows a legacy signal field L-SIG field in the preamble of the protocol version.

It should be understood that the HE-SIG field includes at least two parts. A first part immediately follows the L-SIG field, and a second part may be in any location of a non-legacy part. In a preferred embodiment, the second part may follow an HE-STF and an HE-LTF. This embodiment of the present invention mainly targets the first part of the HE-SIG field.

It should also be understood that this embodiment of the present invention does not limit a naming manner of the HE-SIG field, which may be high efficiency (HE, High Efficiency), high efficiency wireless local area network (HEW, High Efficiency WLAN), or the like.

Optionally, in an embodiment, the restoration unit 92 is specifically configured to process the first OFDM symbol by using a first de-interleaver to generate a first sequence, and process the second OFDM symbol by using a second de-interleaver to generate a second sequence, so as to determine that the first sequence and the second sequence are the same, that is, to determine that the preamble is the preamble of the first protocol version, where the first de-interleaver and the second de-interleaver are different.

When generating the HE-SIG field of the preamble, the transmit end device generates the first OFDM symbol and the second OFDM symbol according to a same input bit sequence. A process in which the receive end device 90 restores the first OFDM symbol and the second OFDM symbol may be considered as an inverse process of a generation process performed by the transmit end device, that is, demodulation, de-interleaving, and decoding that are performed on the first OFDM symbol and the second OFDM symbol by the receive end device 90 are corresponding to modulation, interleaving, and encoding that are performed on the first OFDM symbol and the second OFDM symbol by the transmit end device. Specifically, the transmit end device generates the first OFDM symbol by using an encoder, a first modulator, and a first interleaver. A modulation manner corresponding to the first modulator may be BPSK. Correspondingly, when restoring the first OFDM symbol, the receive end device needs to de-interleave the first OFDM symbol by using a first de-interleaver corresponding to the first interleaver. The transmit end device generates the second OFDM symbol by using the same encoder and first modulator that are used to generate the first OFDM symbol and a second interleaver that is different from the first interleaver used to generate the first OFDM symbol. Correspondingly, when restoring the second OFDM symbol, the receive end device needs to de-interleave the first OFDM symbol by using a second de-interleaver corresponding to the second interleaver. Then the de-interleaved first OFDM symbol is compared with the de-interleaved second OFDM symbol, and if sequences are the same, the preamble may be determined as an 802.11ax preamble.

Optionally, in an embodiment, the restoration unit 92 is specifically configured to process the first OFDM symbol by using a first demodulator and a de-interleaver to generate a first sequence, and process the second OFDM symbol by using a second demodulator to generate a second sequence, so as to determine that the first sequence and the second sequence are the same, that is, to determine that the preamble is the preamble of the first protocol version, where the first demodulator and the second demodulator are the same or different.

Specifically, the transmit end device generates the first OFDM symbol by using an encoder, a first modulator, and an interleaver. A modulation manner corresponding to the first modulator may be BPSK. Correspondingly, when restoring the first OFDM symbol, the receive end device needs to de-interleave the first OFDM symbol by using a de-interleaver corresponding to the interleaver. The transmit end device generates the second OFDM symbol by using the same encoder and second modulator that are used to generate the first OFDM symbol, and interleaving is not performed. A modulation manner corresponding to the second modulator may be QBPSK. Correspondingly, when restoring the second OFDM symbol, the receive end device needs to rotate the OFDM symbol 90 degrees clockwise by using the second demodulator. Then the de-interleaved first OFDM symbol is compared with the de-interleaved second OFDM symbol, and if sequences are the same, the preamble may be determined as an 802.11ax preamble.

Optionally, in an embodiment, the restoration unit 92 is specifically configured to process the first OFDM symbol by using a first demodulator to generate a first sequence, and process the second OFDM symbol by using a second demodulator and a de-interleaver to generate a second sequence, so as to determine that the first sequence and the second sequence are the same, that is, to determine that the preamble is the preamble of the first protocol version, where the first demodulator and the second demodulator are the same or different.

Specifically, the transmit end device generates the first OFDM symbol by using an encoder and a first modulator, and interleaving is not performed. A modulation manner corresponding to the first modulator may be BPSK. The transmit end device generates the second OFDM symbol by using an encoder, a second modulator, and an interleaver. A modulation manner corresponding to the second modulator may be QBPSK. Correspondingly, when restoring the second OFDM symbol, the receive end device needs to de-interleave the second OFDM symbol by using a de-interleaver corresponding to the interleaver and perform phase rotation on the second OFDM symbol by 90 degrees clockwise by using the second demodulator. Then the processed first OFDM symbol is compared with the de-interleaved and demodulated second OFDM symbol, and if sequences are the same, the preamble may be determined as an 802.11ax preamble.

Optionally, in an embodiment, the restoration unit 92 is specifically configured to process the first OFDM symbol by using a first demodulator to generate a first sequence, and process the second OFDM symbol by using a second demodulator to generate a second sequence, so as to determine that the first sequence and the second sequence are the same, that is, to determine that the preamble is the preamble of the first protocol version, where the first demodulator and the second demodulator are the same or different.

Optionally, in an embodiment, the restoration unit 92 is specifically configured to process the first OFDM symbol by using a de-interleaver to generate a first sequence, and process the second OFDM symbol by using the de-interleaver to generate a second sequence, so as to determine that the first sequence and the second sequence are the same, that is, to determine that the preamble is the preamble of the first protocol version.

Optionally, in an embodiment, a subcarrier spacing used by the first OFDM symbol and the second OFDM symbol is 312.5 kHz, and a guard interval (GI) between the first OFDM symbol and the second OFDM symbol is 0.8 µs.

The receive end device 90 in this embodiment of the present invention receives a preamble sent by a transmit end device for a protocol version of a wireless local area network, restores a first OFDM symbol and a second OFDM symbol that are in an HE-SIG field of the preamble, and when determining that input information bits obtained after restoring the first OFDM symbol and the second OFDM symbol are the same, determines that the preamble is a preamble of a first protocol version. Rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence. In addition, a subcarrier spacing and a guard interval that are used by the first OFDM symbol and the second OFDM symbol are the same as a subcarrier spacing and a guard interval used in an existing protocol version. Therefore, normal reception of an 802.11ax preamble at a receive end of the existing protocol version can be ensured, not affecting performance of the receive end of the existing protocol version.

Figure 10:
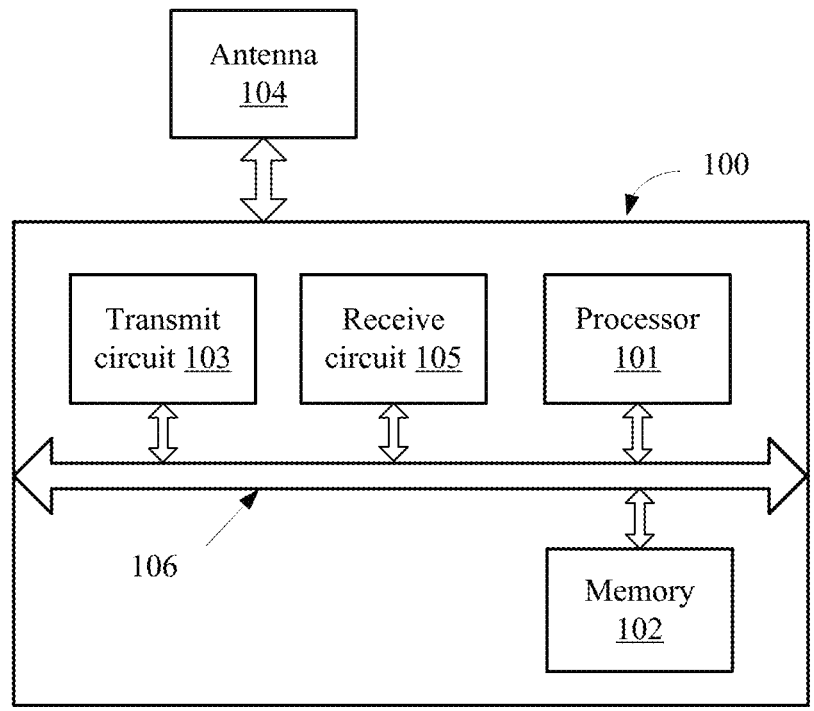
FIG. 10 is a structural block diagram of a transmit end device according to another embodiment of the present invention.

FIG. 10 is a structural block diagram of a transmit end device according to another embodiment of the present invention. A transmit end device 100 in FIG. 10 includes a processor 101, a memory 102, a transmit circuit 103, and an antenna 104.

The memory 102 is configured to store an instruction for the processor 101 to execute the following operations: generating a preamble for a protocol version of a wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the first OFDM symbol is the same as that of the second OFDM symbol, and sending the preamble to a receive end device by using the transmit circuit 103, so that the receive end device restores the preamble, and when determining that input information bits obtained after restoring the first OFDM symbol and the second OFDM symbol are the same, determines that the preamble is the preamble of the protocol version.

When generating a preamble for a protocol version of a wireless local area network, the transmit end device 100 in this embodiment of the present invention generates a first orthogonal frequency division multiplexing (OFDM) symbol and a second OFDM symbol according to a same input information bit, and input information bits obtained after a receive end device restores the first OFDM symbol and the second OFDM symbol can be the same, so that the receive end device determines that the preamble is the preamble of the protocol version, and rapid and reliable auto-detection of the 802.11ax version preamble can be implemented. In addition, when 802.11ax is applied to an outdoor scenario, reliability and correctness of preamble transmission and auto-detection may be improved by using the first OFDM symbol and the second OFDM symbol that include a same bit sequence.

In addition, the transmit end device 100 may further include a receive circuit 105, a bus 106, and the like. The processor 101 controls an operation of the transmit end device 100, and the processor 101 may also be referred to as a CPU (Central Processing Unit, central processing unit). The memory 102 may include a read-only memory and a random access memory, and provide an instruction and data for the processor 101. A part of the memory 102 may further include a non-volatile random access memory (NVRAM). In specific application, the transmit circuit 103 and the receive circuit 105 may be coupled to the antenna 104. Components of the transmit end device 100 are coupled together by using the bus system 106. The bus system 106 may further includes a power bus, a control bus, a status signal bus, and the like, in addition to a data bus. However, for clarity of description, various buses are marked as the bus system 106 in the figure.

The method disclosed in the foregoing embodiments of the present invention may be applied to the processor 101, or implemented by the processor 101. The processor 101 may be an integrated circuit chip and has a signal processing capability. In an implementation process, the steps in the foregoing method may be completed by using an integrated logic circuit of hardware in the processor 101 or an instruction in a form of software. The processor 101 may be a general processor, a digital signal processor (DSP), an application-specific integrated circuit (ASIC), a field programmable gate array (FPGA) or another programmable logic device, a discrete gate or transistor logic device, or a discrete hardware assembly. The processor 101 may implement or execute the methods, steps, and logical block diagrams disclosed in the embodiments of the present invention. The general-purpose processor may be a microprocessor or the processor may be any conventional processor, or the like. The steps of the method disclosed with reference to the embodiments of the present invention may be directly performed and completed by using a hardware decoding processor, or performed and completed by combining hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 102. The processor 101 reads information in the memory 102, and completes the steps of the foregoing method in combination with hardware of the memory 102.

Figure 11:
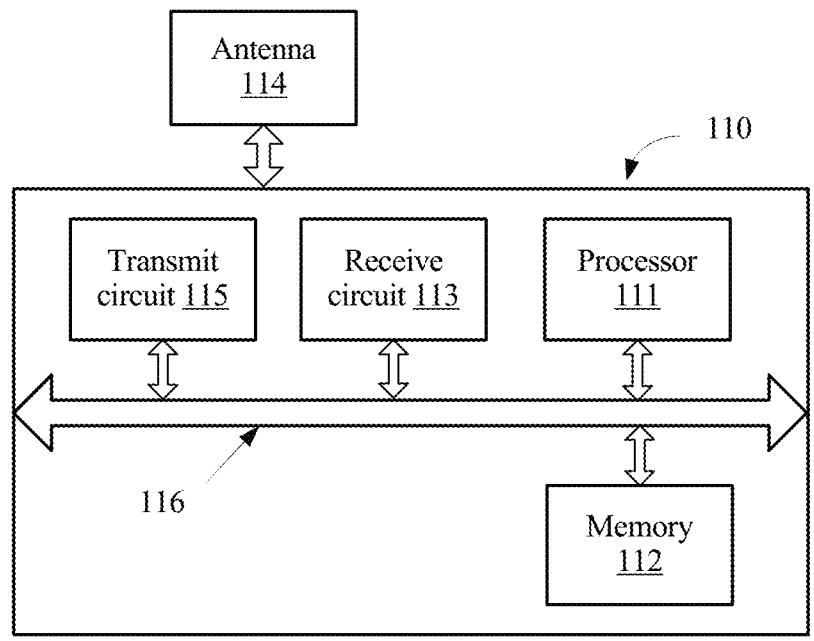
FIG. 11 is a structural block diagram of a receive end device according to another embodiment of the present invention.

FIG. 11 is a structural block diagram of a receive end device according to another embodiment of the present invention. A receive end device 110 in FIG. 11 includes a processor 111, a memory 112, a receive circuit 113, and an antenna 114.

The memory 102 is configured to store an instruction for the processor 101 to execute the following operations: receiving, by using the receive circuit 113, a preamble sent by a transmit end device for a protocol version of a wireless local area network, where the preamble includes a legacy signal (L-SIG) field and a high efficiency signal (HE-SIG) field that are arranged in order, the HE-SIG field includes a first orthogonal frequency division multiplexing (OFDM) symbol and a second OFDM symbol that are arranged in order, and an input information bit of the second OFDM symbol is the same as that of the first OFDM symbol, restoring the first OFDM symbol and the second OFDM symbol that are in the HE-SIG field of the preamble, determining that sequences obtained after the first OFDM symbol and the second OFDM symbol are restored are the same, and restoring a remaining field of the preamble and a data part according to a predetermined rule of the protocol version.

The receive end device 110 in this embodiment of the present invention receives a preamble sent by a transmit end device for a protocol version of a wireless local area network, restores a first OFDM symbol and a second OFDM symbol that are in an HE-SIG field of the preamble, and when determining that input information bits obtained after restoring the first OFDM symbol and the second OFDM symbol are the same, determines that the preamble is a preamble of a first protocol version. Rapid and reliable auto-detection of a preamble of an 802.11ax version can be implemented. In addition, when 802.11ax is applied to an outdoor scenario, reliability and correctness of preamble transmission and auto-detection may be improved by using the first OFDM symbol and the second OFDM symbol that include a same bit sequence.

In addition, the receive end device 110 may further include a transmit circuit 115, a bus 116, and the like. The processor 11 controls an operation of the receive end device 11o, and the processor 111 may also be referred to as a CPU (Central Processing Unit, central processing unit). The memory 112 may include a read-only memory and a random access memory, and provide an instruction and data for the processor 111. A part of the memory 112 may further include a non-volatile random access memory (NVRAM). In specific application, the receive circuit 113 and the transmit circuit 115 may be coupled to the antenna 114. Components of the receive end device 110 are coupled together by using the bus system 116. The bus system 116 may further includes a power bus, a control bus, a status signal bus, and the like, in addition to a data bus. However, for clarity of description, various buses are marked as the bus system 116 in the figure.

The method disclosed in the foregoing embodiments of the present invention may be applied to the processor 111, or implemented by the processor 111. The processor 111 may be an integrated circuit chip and has a signal processing capability. In an implementation process, the steps in the foregoing method may be completed by using an integrated logic circuit of hardware in the processor 111 or an instruction in a form of software. The processor 111 may be a general processor, a digital signal processor (DSP), an application-specific integrated circuit (ASIC), a field programmable gate array (FPGA) or another programmable logic device, a discrete gate or transistor logic device, or a discrete hardware assembly. The processor 111 may implement or execute the methods, steps, and logical block diagrams disclosed in the embodiments of the present invention. The general-purpose processor may be a microprocessor or the processor may be any conventional processor, or the like. The steps of the method disclosed with reference to the embodiments of the present invention may be directly performed and completed by using a hardware decoding processor, or performed and completed by combining hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 112. The processor 111 reads information in the memory 112, and completes the steps of the foregoing method in combination with hardware of the memory 112.

A person skilled in the art may understand that possible replacements may be made to solutions in the foregoing implementation manners. For example, a first OFDM symbol and a second OFDM symbol that are in a preamble may be symbols in another field such as symbols in a legacy signal (L-SIG) field. As long as input information bits of the first OFDM symbol and the second OFDM symbol are the same, a protocol version of the preamble may be obtained according to these two OFDM symbols, and application of a specific process of generating these two OFDM symbols in the foregoing implementation manners is unaffected. Specifically, how to obtain the first OFDM symbol and the second OFDM symbol by processing the same input information bit is not limited. In addition, the preamble in the foregoing implementation manners may have another possible transformation. For example, another field exists between a legacy signal (L-SIG) field and an HE-SIG field, or in some cases, for example, an uplink preamble does not include an HE-SIG field.

In addition, according to some preferred implementation manners of generating these two OFDM symbols in the foregoing implementation manners, time domain signals of these two generated OFDM symbols are different. In this way, a frequency selectivity gain may be obtained when the receive end performs combined reception, so that a bit error rate is reduced.

The foregoing provides multiple implementation manners of generating the first OFDM symbol and the second OFDM symbol, and alternatively, the generating a preamble for a protocol version of a wireless local area network may include: processing the input information bit by using a channel encoder, an interleaver, and a first modulator, and performing subcarrier mapping in a first order to generate the first OFDM symbol, and processing the input information bit by using the channel encoder, the interleaver, and a second modulator, and performing subcarrier mapping in a second order to generate the second OFDM symbol, where the first modulator and the second modulator are the same or different, and the first order and the second order are different.

The following describes several possible specific examples. In a specific example, a transmit end generates a preamble that includes a legacy preamble part that conforms to an 802.11n/ac standard and an HEW-SIG1 field that conforms to 802.11ax. The HEW-SIG1 field includes two consecutive OFDM symbols. A first OFDM symbol in the HEW-SIG1 field uses a subcarrier spacing of 312.5 kHz and a GI of 0.8 μs. An input information bit carried in the first OFDM symbol is processed by using a channel encoder and an interleaver and then modulated by using BPSK. Then a modulation symbol is sequentially mapped to all subcarriers. A second OFDM symbol in the HEW-SIG1 field uses the subcarrier spacing of 312.5 kHz and the GI of 0.8 μs. An input information bit carried in the second OFDM symbol is the same as the input information bit carried in the first OFDM symbol in the HEW-SIG1 field, and is processed by using the channel encoder and the interleaver and then modulated by using the BPSK. Then a modulation symbol is mapped to all subcarriers in a reversed order.

After the second OFDM symbol in the HEW-SIG1 field is sent, a subsequent OFDM symbol (including a remaining field of the preamble that conforms to 802.11ax, and a data field) may be sent by using a subcarrier spacing of 312.5 kHz or another value and a GI of 0.8 μs or another value. This is not limited herein.

Correspondingly, at a receive end that conforms to an 802.11ax standard,

001a. Perform channel equalization on a first OFDM symbol and a second OFDM symbol that follow a received legacy preamble (such as an SIG/L-SIG field) to obtain a first frequency domain sequence and a second frequency domain sequence, respectively, and cache the first frequency domain sequence and the second frequency domain sequence.

002a. Demap the first frequency domain sequence according to a first order to obtain a third frequency domain sequence, demap the second frequency domain sequence according to a second order to obtain a fourth frequency domain sequence, and then determine whether the third frequency domain sequence and the fourth frequency domain sequence are the same. If the third frequency domain sequence and the fourth frequency domain sequence are the same, the data packet is considered as an 802.11ax data packet. Go to step 003. If the third frequency domain sequence and the fourth frequency domain sequence are not the same, the data packet is not an 802.11ax data packet. Return to step 001 in which the first frequency domain sequence and the second frequency domain sequence are cached. A protocol version of the data packet is further identified according to the prior art or another technology (such as an auto-detection method defined in the 802.11n/ac standard).

003a. Perform soft-bit combination on information carried in subcarriers corresponding to the third frequency domain sequence and the fourth frequency domain sequence, and then perform processing such as decoding according to the 802.11ax standard.

004a. Receive a subsequent OFDM symbol (including a remaining part of the preamble and a data part) according to a subcarrier spacing and a GI that are corresponding to a transmit end.

For a receive end that conforms to the 802.11n/ac standard but does not conform to the 802.11ax standard, because two OFDM symbols of the HEW-SIG1 field that follow the L-SIG field of the preamble are modulated by using the BPSK, the 11n/ac receive end processes an 802.11ax data packet in a manner of processing an 802.11a data packet, and backward compatibility is unaffected.

Figure 15:
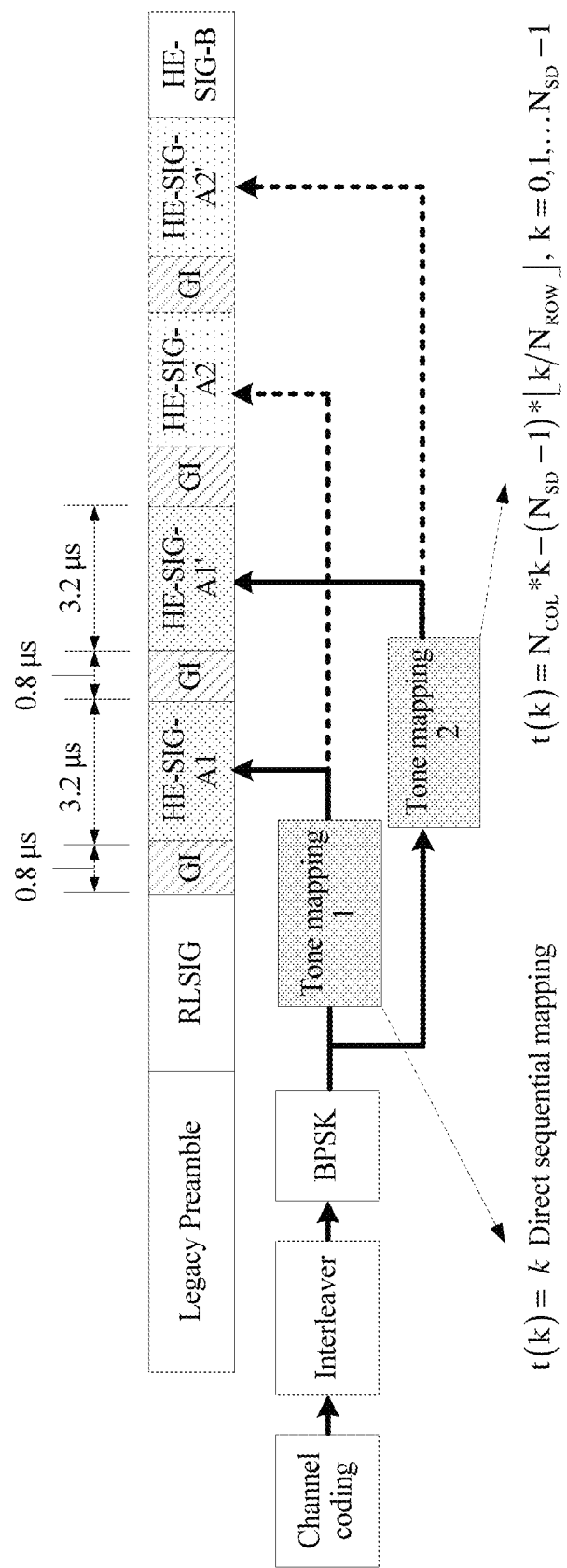
FIG. 15 to FIG. 17 are schematic diagrams of operating principles of some other embodiments of the present invention.

A person skilled in the art learns that the foregoing HEW-SIG1 may also be referred to as an HE-SIG-A. All implementation manners may be applied to not only the HE-SIG-A but also another possible pilot field, and the like. In an alternative preferred implementation manner, as shown in FIG. 15, an HE-SIG-A field includes two OFDM symbols, and at a transmit end (which, for example, conforms to 802.11ax) in a wireless local area network, the method includes the following steps: 1501. Generate a first OFDM symbol in the HE-SIG-A field, where the symbol may use a subcarrier spacing of 312.5 kHz and a GI of 0.8 μs, an information bit carried in the first OFDM symbol is processed by using a channel encoder Channel coding and an interleaver Interleaver and then modulated by using a first modulator such as a BPSK modulator. Then a generated modulation symbol is mapped to all data subcarriers according to a first order shown in the following formula. The first OFDM symbol (an HE-SIG-Ai) of the HE-SIG-A field shown in FIG. 15 is obtained after other subsequent processing.

The $k^{th}$ modulation symbol is mapped to the $t^{th}$ data subcarrier according to:

$$t(k)=k, k=0,1,\ldots N_{SD}-1 \qquad (1)$$

and IDFT transform is performed, so as to generate the second OFDM symbol.

$N_{SD}$ indicates a quantity of data subcarriers. For example, when a bandwidth is 20 MHz, $N_{SD}$ may be 48 or 52.

In this case, mapping in the first order is equivalent to direct sequential mapping.

1502. Generate a second OFDM symbol in the HE-SIG-A field after generating the first OFDM symbol in the HE-SIG-A field, where the second OFDM symbol may use the subcarrier spacing of 312.5 kHz and the GI of 0.8 μs, and an information bit carried in the second OFDM symbol is the same as the information bit carried in the first OFDM symbol in the HE-SIG-A field, and is processed by using the channel encoder Channel coding and the interleaver Interleaver and then modulated by using a second modulator such as the BPSK modulator. The second modulator and the first modulator are the same or different (for example, the second modulator may be a QBPSK modulator). Then a generated modulation symbol is mapped to all data subcarriers according to a second order shown in formula 2:

$$t(k)=N_{COL}*k-(N_{SD}-1)*\lfloor k/N_{ROW} \rfloor, k=0,1,\ldots N_{SD}-1 \qquad (2)$$

that is, the $k^{th}$ modulation symbol is mapped to the $t^{th}$ data subcarrier and IDFT transform is performed. When $N_{SD}=48$, $N_{COL}$ may be 16 and $N_{ROW}$ may be 3. When $N_{SD}=52$, $N_{COL}$ may be 13 and $N_{ROW}$ may be 4.

It should be understood that when the second modulator uses BPSK or QBPSK modulation, a technical effect of mapping the generated modulation symbol to all the data subcarriers according to the second order is the same as a technical effect of performing BPSK or QBPSK modulation on a carried information bit immediately after the carried information bit is processed by using the channel encoder, and directly and sequentially mapping a generated modulation symbol to all the data subcarriers.

Specifically, the mapping in the second order is the same as a step 3 of a sorting operation (formula (2)) that is in a de-interleaving operation performed by a receive end and that is specified in an existing standard such as 802.11n or 802.11ac. A module in an existing receiving unit may be reused in actual implementation, so that the implementation becomes easier without raising a bit error rate. If the second modulator uses higher-order modulation such as 16QAM or 64QAM, because the step 3 of the sorting operation (formula (2)) that is in the de-interleaving operation performed by the receive end and that is specified in the existing standard is irrelevant to a modulation order, a mapping operation may be still performed by directly using the second order described in formula 2, and extensibility is good.

It should be understood that if the HE-SIG-A field includes four OFDM symbols, a third OFDM symbol and a fourth OFDM symbol may be generated by using similar steps.

It should be understood that if a transmission bandwidth is greater than 20 MHz, such as 40 MHz, 80 MHz, or 160 MHz, after subcarrier mapping is performed in the first order or the second order, a subcarrier signal generated on a 20 MHz bandwidth is copied to all 20 MHz sub-channels of the transmission bandwidth, and then IDFT transform is performed.

Correspondingly, at a receive end (for example, of 802.11ax) in the wireless local area network, 1601. Perform channel equalization on a first OFDM symbol and a second OFDM symbol that are in an HE-SIG-A field to obtain a frequency domain sequence 1 and a frequency domain sequence 2, and cache the frequency domain sequence 1 and the frequency domain sequence 2.

1602. Demap the frequency domain sequence 1 according to a first order to obtain a frequency domain sequence 3, that is, perform a demapping operation directly and sequentially or according to:

$$k(t)=t, t=0,1,\ldots N_{SD}-1 \quad (3)$$

to obtain a frequency domain sequence 3.

1603. Demap the frequency domain sequence 2 according to a second order to obtain a frequency domain sequence 4, that is, obtain a frequency domain sequence 4 according to:

$$k(t)=N_{ROW}*(t \bmod N_{COL})+\lfloor t/N_{COL}\rfloor, t=0,1,\ldots N_{SD}-1 \quad (4).$$

1604. Perform BPSK demodulation on the frequency domain sequence 3 and the frequency domain sequence 4, perform soft-bit combination, and perform decoding according to an existing standard.

Figure 16:
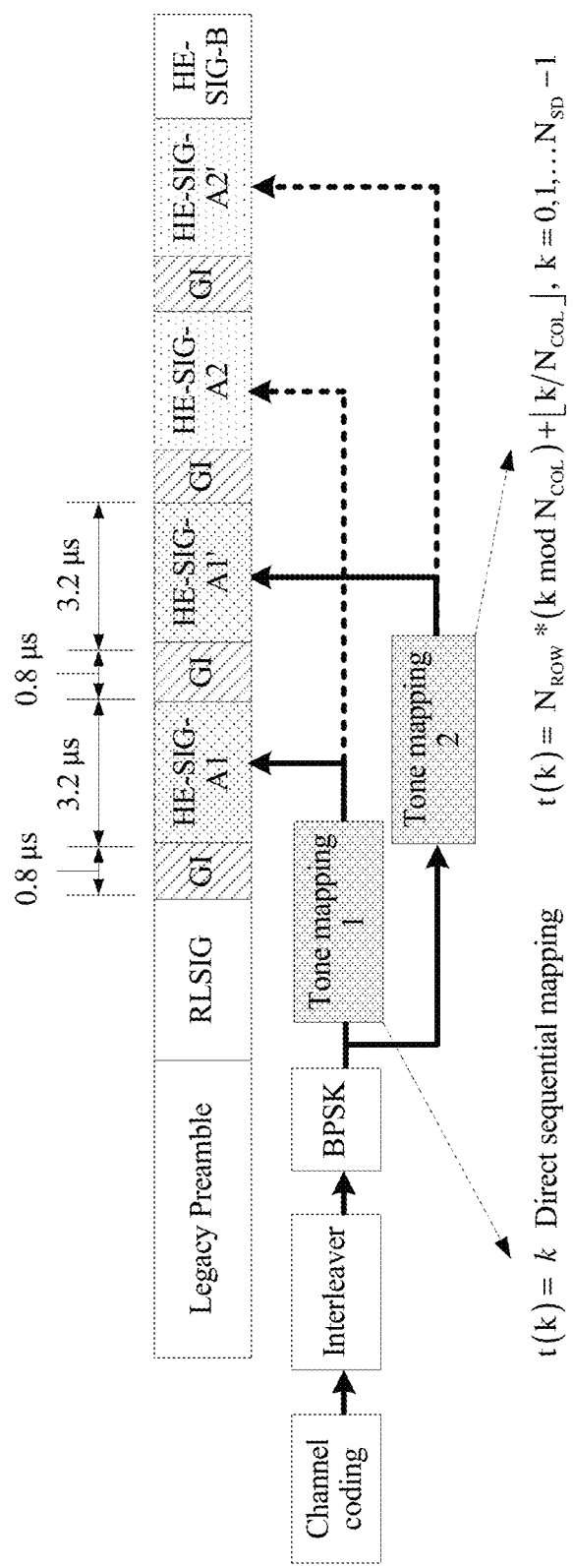

In an alternative preferred implementation manner, as shown in FIG. 16, an HE-SIG-A field includes two OFDM symbols, and at a transmit end (which, for example, conforms to 802.11ax) in a wireless local area network, the method includes the following steps:

1701. Similar to step 1501 in the previous implementation manner, generate a first OFDM symbol in the HE-SIG-A field, where the symbol may use a subcarrier spacing of 312.5 kHz and a GI of 0.8 μs, and an information bit carried in the first OFDM symbol is processed by using a channel encoder Channel coding and an interleaver Interleaver and then modulated by using a first modulator such as a BPSK modulator. Then a generated modulation symbol is mapped to all data subcarriers according to a first order shown in the following formula. The first OFDM symbol (an HE-SIG-Ai) of the HE-SIG-A field shown in FIG. 16 is obtained after other subsequent processing.

The $k^{th}$ modulation symbol is mapped to the $t^{th}$ data subcarrier according to:

$$t(k)=k, k=0,1,\ldots N_{SD}-1 \quad (1)$$

and IDFT transform is performed, so as to generate the first OFDM symbol.

$N_{SD}$ indicates a quantity of data subcarriers, and when a bandwidth is 20 MHz, $N_{SD}$ may be 48 or 52.

In this case, mapping in the first order is equivalent to direct sequential mapping.

1702. Generate a second OFDM symbol in the HE-SIG-A field after generating the first OFDM symbol in the HE-SIG-A field, where the symbol may use the subcarrier spacing of 312.5 kHz and the GI of 0.8 μs, and an information bit carried in the second OFDM symbol is the same as the information bit carried in the first OFDM symbol in the HE-SIG-A field, and is processed by using the channel encoder and the interleaver and then modulated by using a second modulator such as the BPSK modulator. The second modulator and the first modulator are the same or different (for example, the second modulator may be a QBPSK modulator). Then a generated modulation symbol is mapped to all data subcarriers according to a second order shown in formula 5:

$$t(k)=N_{ROW}*(k \bmod N_{COL})+\lfloor k/N_{COL}\rfloor, k=0,1,\ldots N_{SD}-1 \quad (5),$$

that is, the $k^{th}$ modulation symbol is mapped to the $t^{th}$ data subcarrier and IDFT transform is performed. When $N_{SD}=48$, $N_{COL}$ may be 16 and $N_{ROW}$ may be 3. When $N_{SD}=52$, $N_{COL}$ may be 13 and $N_{ROW}$ may be 4.

It should be understood that when the second modulator uses BPSK or QBPSK modulation, a technical effect of mapping the generated modulation symbol to all the data subcarriers according to the second order is the same as a technical effect of performing BPSK or QBPSK modulation on a carried information bit immediately after the carried information bit is processed by using the channel encoder and the interleaver, and sequentially mapping the generated modulation symbol to all the data subcarriers after the generated modulation symbol is processed by using the interleaver again.

The mapping in the second order is the same as a step 1 of a sorting operation (formula (5)) that is in an interleaving operation performed by a transmit end and that is specified in an existing standard. An interleaver module in an existing sending unit may be reused in actual implementation, so that the implementation becomes easier without raising a bit error rate.

If the second modulator uses higher-order modulation such as 16QAM or 64QAM, because the step 1 of the sorting operation that is in the interleaving operation performed by the transmit end and that is specified in the existing standard is irrelevant to a modulation order, a mapping operation may be still performed by directly using the second order described in the formula, and extensibility is good.

Correspondingly, at a receive end (of, such as, 802.11ax) in the wireless local area network, 1801. Referring to step 1601, perform channel equalization on a first OFDM symbol and a second OFDM symbol that are in an HE-SIG-A field to obtain a frequency domain sequence 1 and a frequency domain sequence 2, and cache the frequency domain sequence 1 and the frequency domain sequence 2.

1802. Demap the frequency domain sequence 1 according to a first order to obtain a frequency domain sequence 3, that is, perform a demapping operation according to:

$$k(t)=t, t=0,1,\ldots N_{SD}-1 \quad (6)$$

to obtain a frequency domain sequence 3.

1803. Demap the frequency domain sequence 2 according to a second order to obtain a frequency domain sequence 4, that is, perform a demapping operation according to:

$$k(t)=N_{COL}*t(N_{SD}-1)*\lfloor t/N_{ROW}\rfloor, t=0,1,\ldots N_{SD}-1 \quad (7)$$

to obtain a frequency domain sequence 4.

1804. Perform BPSK demodulation on the frequency domain sequence 3 and the frequency domain sequence 4, perform soft-bit combination, and perform decoding according to an existing standard.

Figure 17:
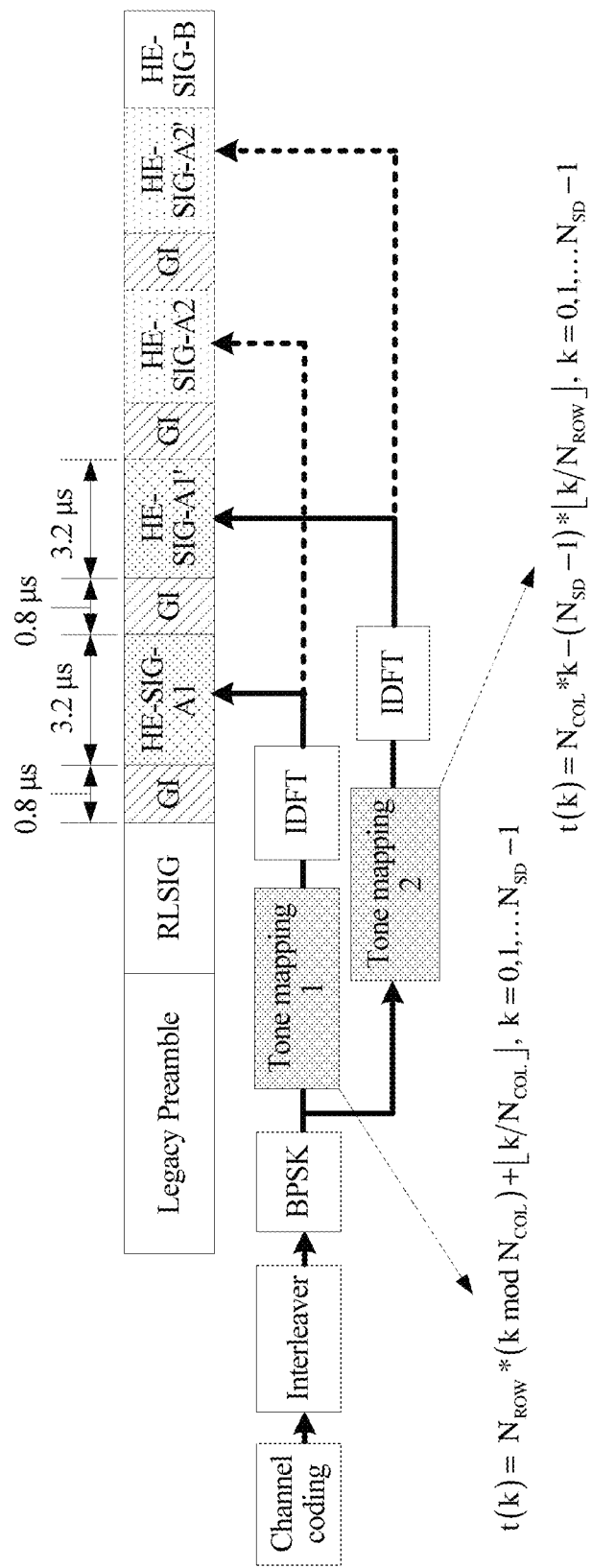

In an alternative preferred implementation manner, as shown in FIG. 17, an HE-SIG-A field includes two OFDM symbols, and at a transmit end (which, for example, conforms to 802.11ax) in a wireless local area network, the method includes the following steps: 1901. Generate a first OFDM symbol in the HE-SIG-A field, where the symbol may use a subcarrier spacing of 312.5 kHz and a GI of 0.8 µs, an information bit carried in the first OFDM symbol is processed by using a channel encoder and an interleaver and then modulated by using a first modulator such as a BPSK modulator. Then a generated modulation symbol is mapped to all data subcarriers according to a first order shown in the following formula:

$$t(k)=N_{ROW}*(k \bmod N_{COL})+\lfloor k/N_{COL}\rfloor, k=0,1,\ldots N_{SD}-1 \quad (8)$$

that is, the $k^{th}$ modulation symbol is mapped to the $t^{th}$ data subcarrier and IDFT transform is performed. $N_{SD}$ indicates a quantity of data subcarriers, and when a bandwidth is 20 MHz, $N_{SD}$ may be 48 or 52. When $N_{SD}=48$, $N_{COL}$ may be 16 and $N_{ROW}$ may be 3. When $N_{SD}=52$, $N_{COL}$ may be 13 and $N_{ROW}$ may be 4.

1902. Generate a second OFDM symbol in the HE-SIG-A field after generating the first OFDM symbol in the HE-SIG-A field, where the second OFDM symbol may use the subcarrier spacing of 312.5 kHz and the GI of 0.8 µs, and an information bit carried in the second OFDM symbol is the same as the information bit carried in the first OFDM symbol in the HE-SIG-A field, and is processed by using the channel encoder and the interleaver and then modulated by using a second modulator such as the BPSK modulator. The second modulator and the first modulator are the same or different (for example, the second modulator may be a QBPSK modulator). Then a generated modulation symbol is mapped to all data subcarriers according to a second order shown in the following formula:

$$t(k)=N_{COL}*k-(N_{SD}-1)*\lfloor k/N_{ROW}\rfloor, k=0,1,\ldots N_{SD}-1 \quad (9)$$

that is, the $k^{th}$ modulation symbol is mapped to the $t^{th}$ data subcarrier and IDFT transform is performed. When $N_{SD}=48$, $N_{COL}$ may be 16 and $N_{ROW}$ may be 3. When $N_{SD}=52$, $N_{COL}$ may be 13 and $N_{ROW}$ may be 4.

Correspondingly, at a receive end (of, such as, 802.11ax) in the wireless local area network, 2001. Perform channel equalization on a first OFDM symbol and a second OFDM symbol that are in an HE-SIG-A field to obtain a frequency domain sequence 1 and a frequency domain sequence 2, and cache the frequency domain sequence 1 and the frequency domain sequence 2.

2002. Demap the frequency domain sequence 1 according to a first order to obtain a frequency domain sequence 3, that is, perform a demapping operation according to:

$$k(t)=N_{COL}*t-(N_{SD}-1)*\lfloor t/N_{ROW}\rfloor, t=0,1,\ldots N_{SD}-1 \quad (10)$$

to obtain a frequency domain sequence 3.

2003. Demap the frequency domain sequence 2 according to a second order to obtain a frequency domain sequence 4, that is, perform a demapping operation according to:

$$k(t)=N_{ROW}*(t \bmod N_{COL})+\lfloor t/N_{COL}\rfloor, t=0,1,\ldots N_{SD}-1 \quad (11)$$

to obtain a frequency domain sequence 4, where t is an index of a data subcarrier after mapping and k is an index of a modulation symbol.

2004. Perform BPSK demodulation on the frequency domain sequence 3 and the frequency domain sequence 4, perform soft-bit combination, and perform decoding according to an existing standard.

Figure 12:
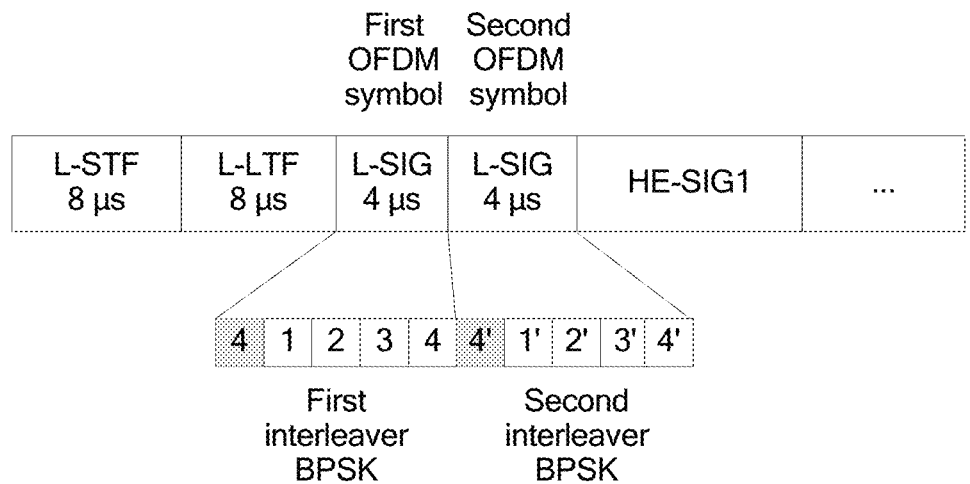
FIG. 12 to FIG. 14 are schematic structural diagrams of a preamble according to some other embodiments of the present invention.

In another specific implementation manner, an 802.11ax transmit end generates a preamble. As shown in FIG. 12, the preamble includes: an L-STF field and an L-LTF field that conform to an 11n/ac standard, an L-SIG field, and an HEW-SIG1 field of 802.11ax. A first OFDM symbol in the L-SIG field conforms to an 11n/ac standard and uses a subcarrier spacing of 312.5 kHz and a GI of 0.8 µs. An information bit carried in the first OFDM symbol is processed by using a channel encoder and a first interleaver and then modulated by using BPSK. A second OFDM symbol in the L-SIG field uses the subcarrier spacing of 312.5 kHz and the GI of 0.8 µs. An information bit carried in the second OFDM symbol is the same as the input information bit carried in the first OFDM symbol in the L-SIG field, and is processed by using the channel encoder and a second interleaver (or interleaving may be not performed) and then modulated by using the BPSK.

A symbol (including a remaining field of the preamble and a data field) that follows the second OFDM symbol in the L-SIG field may be sent by using a subcarrier spacing of 312.5 kHz or another value and a GI of 0.8 µs or another value.

Correspondingly, at a receive end,

001b. Perform channel equalization on the first OFDM symbol and the second OFDM symbol that are in the L-SIG field to obtain a first frequency domain sequence and a second frequency domain sequence, respectively, and cache the first frequency domain sequence and the second frequency domain sequence.

002b. Perform de-interleaving on the first frequency domain sequence by using a first de-interleaver to obtain a third frequency domain sequence, and perform (or do not perform) de-interleaving on the second frequency domain sequence by using a second de-interleaver to obtain a fourth frequency domain sequence, then determine whether information carried in a subcarrier corresponding to the third frequency domain sequence is the same as information carried in a subcarrier corresponding to the fourth frequency domain sequence. If the information is the same, the data packet is considered as an 802.11ax data packet. Go to step 003b. If the information is not the same, the data packet is not an 802.11ax data packet. Return to step 001b in which the first frequency domain sequence and the second frequency domain sequence are cached. A mode of the data packet is identified by using an auto-detection method in the prior art.

003b. Perform soft-bit combination on the information carried in the subcarriers corresponding to the third frequency domain sequence and the fourth frequency domain sequence, and then perform decoding according to the 802.11ax standard.

A subsequent OFDM symbol (including a remaining part of the preamble and a data part) is received according to a subcarrier spacing and a GI that are corresponding to the transmit end.

For an 11n receive end, because the second OFDM symbol in the L-SIG field of the preamble is modulated by using the BPSK, the 11n receive end processes an 11ax data packet in a manner of processing an 11a data packet, thereby not affecting backward compatibility.

For an 11ac receive end, because the second OFDM symbol in the L-SIG field of the preamble is modulated by using the BPSK, the 11ac receive end processes an 11ax data packet in a manner of processing an 11a data packet or a manner of processing an 11ac data packet. If the 11ax data packet is processed in the manner of processing the 11a data packet, CRC verification fails after full deframing, and backward compatibility is unaffected. If the 11ax data packet is processed in the manner of processing the 11ac data packet, CTC verification fails after a VHT-SIGA is demodulated, and an 11ac receiver performs backoff according to a frame length indicated in the L-SIG, thereby not affecting backward compatibility.

Figure 13:
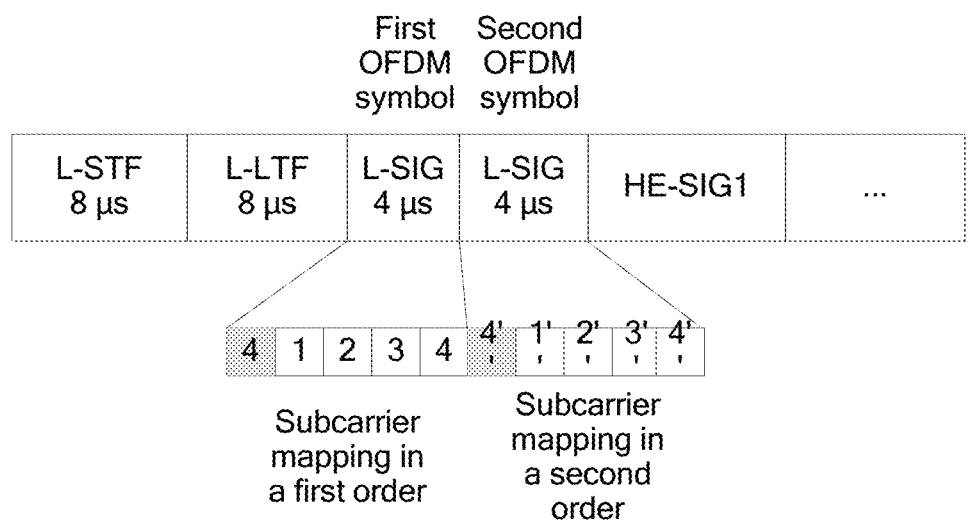

In another specific implementation manner, an 802.11ax transmit end generates a preamble. Referring to FIG. 13, the preamble includes: an L-STF field and an L-LTF field that conform to an 11n/ac standard, and an L-SIG field and an HEW-SIG1 field that are of 802.11ax. The L-SIG field includes two OFDM symbols. A first OFDM symbol in the L-SIG field uses a subcarrier spacing of 312.5 kHz and a GI of 0.8 μs, and an input information bit carried in the first OFDM symbol is processed by using a channel encoder and an interleaver and then modulated by using BPSK. Then a modulation symbol is sequentially mapped to all subcarriers. A second OFDM symbol in the L-SIG field uses the subcarrier spacing of 312.5 kHz and the GI of 0.8 μs. An input information bit carried in the second OFDM symbol is the same as the input information bit carried in the first OFDM symbol in the L-SIG field, and is processed by using the channel encoder and the interleaver and then modulated by using the BPSK. Then a modulation symbol is mapped to all subcarriers in a reversed order.

After the second OFDM symbol in the L-SIG field is sent, a subsequent OFDM symbol (including a remaining field of the preamble and a data field) may be sent by using a subcarrier spacing of 312.5 kHz or another value and a GI of 0.8 μs or another value.

At a receive end,

001c. Perform channel equalization on a first OFDM symbol and a second OFDM symbol that are in a received L-SIG field to obtain a first frequency domain sequence and a second frequency domain sequence, respectively, and cache the first frequency domain sequence and the second frequency domain sequence.

002c. Demap the first frequency domain sequence according to a first order to obtain a third frequency domain sequence, demap the second frequency domain sequence according to a second order to obtain a fourth frequency domain sequence, and then determine whether information carried in a subcarrier corresponding to the third frequency domain sequence is the same as information carried in a subcarrier corresponding to the fourth frequency domain sequence. If the information is the same, the data packet is considered as an 802.11ax data packet. Go to step 003dc. If the information is not the same, the data packet is not an 802.11ax data packet. Return to step 001c in which the first frequency domain sequence and the second frequency domain sequence are cached. A mode of the data packet is identified by using an auto-detection method in the prior art.

003c. Perform soft-bit combination on the information carried in the subcarriers corresponding to the third frequency domain sequence and the fourth frequency domain sequence, and then perform decoding according to the 802.11ax standard.

A subsequent OFDM symbol (including a remaining part of the preamble and a data part) is received according to a subcarrier spacing and a GI that are corresponding to the transmit end.

For an 802.11n receive end, because the second OFDM symbol in the L-SIG field of the preamble is modulated by using the BPSK, the 802.11n receive end processes an 11ax data packet in a manner of processing an 11a data packet, and backward compatibility is unaffected.

For an 802.11ac receive end, because the second OFDM symbol in the L-SIG field of the preamble is modulated by using the BPSK, the 802.11ac receive end processes an 802.11ax data packet in a manner of processing an 802.11a data packet or a manner of processing an 802.11ac data packet. If the 802.11ax data packet is processed in the manner of processing the 802.11a data packet, CRC verification fails after full deframing, not affecting backward compatibility. If the 802.11ax data packet is processed in the manner of processing the 802.11ac data packet, CTC verification fails after a VHT-SIGA is demodulated, and an 802.11ac receiver performs backoff according to a frame length indicated in the L-SIG, thereby not affecting backward compatibility.

Figure 14:
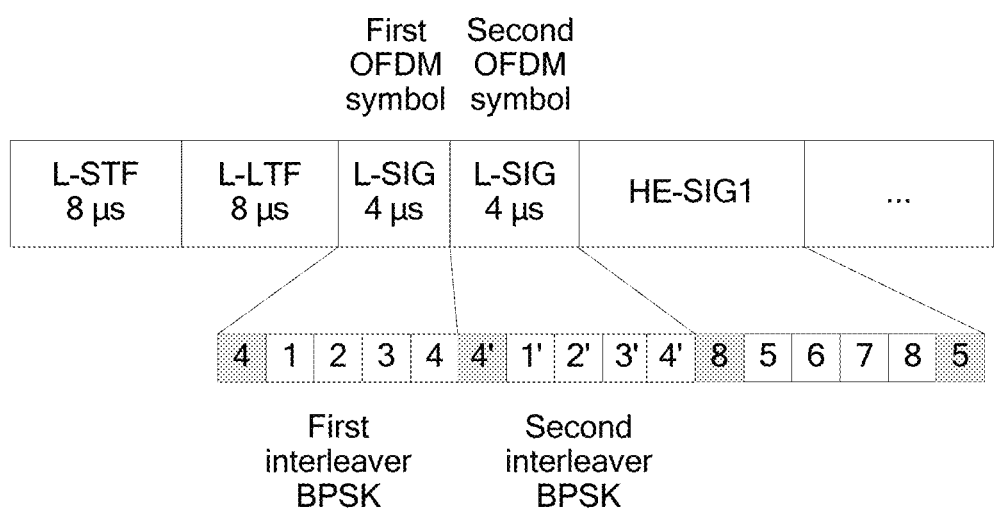

In another preferred implementation manner, an 802.11ax transmit end generates and sends a preamble. Referring to FIG. 14, an L-SIG field of the preamble includes two OFDM symbols, and an HE-SIG1 of the preamble includes at least one OFDM symbol.

Input information bits of a first OFDM symbol and a second OFDM symbol that are in the L-SIG field are the same. For a generation manner of the first OFDM symbol and the second OFDM symbol, refer to the foregoing embodiments.

After sending the second OFDM symbol in the L-SIG field, the transmit end sends a first OFDM symbol of the HE-SIG1 field. The symbol uses a subcarrier spacing of $\Delta f=312.5$ kHz and a guard interval of $T_{GI}=1.6$ μs, an information bit carried in the first OFDM symbol is processed by using a channel encoder and an interleaver and then modulated by using BPSK.

Specifically, a transmission waveform formula of the first OFDM symbol in the HE-SIG1 field is as follows:

$$r_{HE-SIG1_{1st}}(t) = w_T(t) \sum_{k=-N_{ST}/2}^{N_{ST}/2} C_k \exp(j2\pi k \Delta f)(t - T_{post-fix}),$$

where $N_{ST}$ is a quantity of available data plus a quantity of pilot subcarriers, $C_k$ is a modulation symbol carried in each subcarrier, $\Delta f=312.5$ kHz is a subcarrier spacing, $T_{post-fix}=0.8$ μs generates a cyclic prefix of 0.8 μs, and $w_T(t)$ may be but is not limited to a window function recommended in an existing standard, where duration of $w_T(t)$ is:

$$T = \frac{1}{\Delta f} + T_{GI} = 4.8 \text{ μs}.$$

The cyclic prefix $T_{post-fix}$ and the guard interval $T_{GI}$ may take other values as long as the cyclic prefix $T_{post-fix}$ is less than or equal to the guard interval $T_{GI}$. The subcarrier spacing may take another value such as $\Delta f=312.5$ kHz After the first OFDM symbol in the HE-SIG1 field is sent, a subsequent OFDM symbol (including a remaining field of the preamble and a data field) may be sent by using a subcarrier spacing of 312.5 kHz or another value and a GI of 0.8 μs or another value.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A non-transitory computer-readable storage medium storing a computer program for execution by a processor, the computer program including instructions for:
generating, in a wireless local area network, a preamble comprising a high efficiency signal (HE-SIG) field, wherein the HE-SIG field comprises at least two symbols comprising a first orthogonal frequency division multiplexing (OFDM) symbol and a second OFDM symbol, wherein input information bits of the first OFDM symbol are the same as input information bits of the second OFDM symbol, wherein the HE-SIG field further comprises a third OFDM symbol and a fourth OFDM symbol, and wherein input information bits of the third OFDM symbol are the same as input information bits of the fourth OFDM symbol; and
sending the preamble;
wherein the generating the preamble comprises:
obtaining the first OFDM symbol by processing the input information bits of the first OFDM symbol by channel encoding, interleaving, and modulating in a first modulation mode;
obtaining the second OFDM symbol by processing the input information bits of the second OFDM symbol by channel encoding, without interleaving, and modulating in a second modulation mode;
obtaining the third OFDM symbol by processing the input information bits of the third OFDM symbol by channel encoding, interleaving, and modulating in a third modulation mode; and
obtaining the fourth OFDM symbol by processing the input information bits of the fourth OFDM symbol by channel encoding, without interleaving, and modulating in a fourth modulation mode.

2. The storage medium according to claim 1, wherein the third modulation mode is a binary phase-shift keying (BPSK) modulation.

3. The storage medium according to claim 1, wherein the preamble is for an outdoor scenario of the wireless local area network, wherein an auto-detection is associated with the first OFDM symbol and the second OFDM symbol including same input information bits.

4. The storage medium according to claim 1, wherein the first modulation mode is a binary phase-shift keying (BPSK) modulation, and wherein the second modulation mode is a quaternary binary phase shift keying (QBPSK) modulation.

5. A non-transitory computer-readable storage medium storing a computer program for execution by a processor, the computer program including instructions for:
receiving, in a wireless local area network, a preamble comprising a high efficiency signal (HE-SIG) field, wherein the HE-SIG field comprises at least two symbols comprising a first orthogonal frequency division multiplexing (OFDM) symbol, and a second OFDM symbol, wherein the HE-SIG field further comprises a third OFDM symbol and a fourth OFDM symbol;

obtaining information bits of the first OFDM symbol by parsing the first OFDM symbol by de-modulating in a first de-modulation mode, de-interleaving, and channel decoding;

obtaining information bits of the second OFDM symbol by parsing the second OFDM symbol by de-modulating in a second de-modulation mode, without de-interleaving, and channel decoding;

determining whether the obtained information bits of the first OFDM symbol and the obtained information bits of the second OFDM symbol are same by comparing the obtained information bits of the first OFDM symbol and the obtained information bits of the second OFDM symbol with each other;

obtaining information bits of the third OFDM symbol by parsing the third OFDM symbol by de-modulating in a third de-modulation mode, de-interleaving, and channel decoding; and obtaining information bits of the fourth OFDM symbol by parsing the fourth OFDM symbol by de-modulating in a second de-modulation mode, without de-interleaving, and channel decoding.

6. The storage medium according to claim 5, wherein the third de-modulation mode is a binary phase-shift keying (BPSK) de-modulation.

7. The storage medium according to claim 5, the preamble is for an outdoor scenario of the wireless local area network, wherein an auto-detection is associated with determining that the first OFDM symbol and the second OFDM symbol includes same information bits.

8. The storage medium according to claim 5, wherein the first de-modulation mode is a binary phase-shift keying (BPSK) de-modulation, and wherein the second de-modulation mode is a quaternary binary phase shift keying (QBPSK) de-modulation.

* * * * *

UNITED STATES PATENT AND TRADEMARK OFFICE
CERTIFICATE OF CORRECTION

PATENT NO. : 11,729,032 B2
APPLICATION NO. : 17/519405
DATED : August 15, 2023
INVENTOR(S) : Zhang et al.

Page 1 of 1

It is certified that error appears in the above-identified patent and that said Letters Patent is hereby corrected as shown below:

In the Specification

In Column 25, Line 47, delete "11" and insert -- 111 --.

In Column 25, Line 48, delete "11o," and insert -- 110, --.

In Column 28, Line 15, delete "HE-SIG-Ai)" and insert -- HE-SIG-A1) --.

In Column 29, Line 53, delete "HE-SIG-Ai)" and insert -- HE-SIG-A1) --.

In Column 33, Line 48, delete "003dc." and insert -- 003c. --.

Signed and Sealed this
Twenty-fourth Day of October, 2023

Katherine Kelly Vidal
*Director of the United States Patent and Trademark Office*